United States Patent Office 3,058,218
Patented Oct. 16, 1962

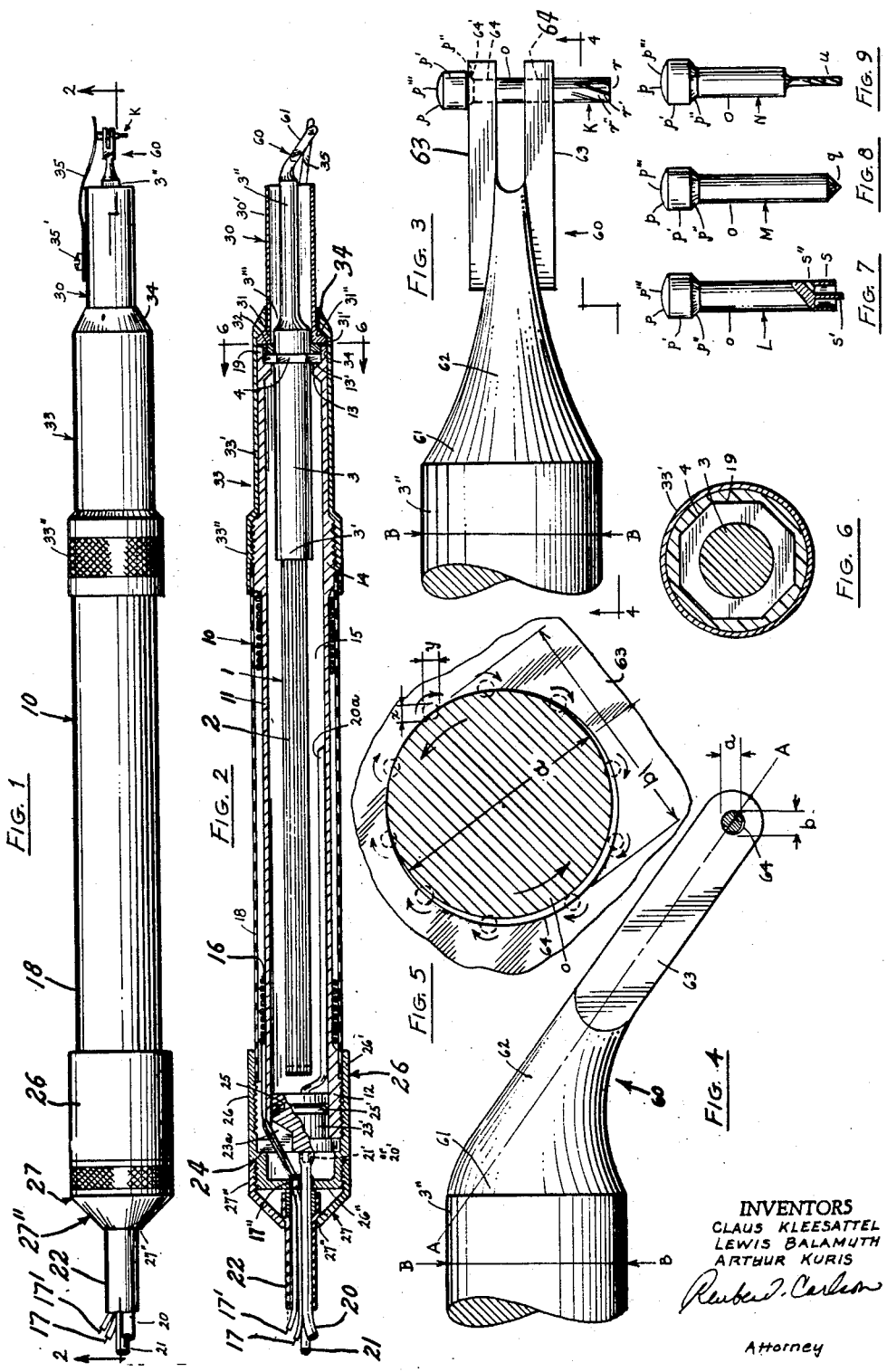
Oct. 16, 1962     C. KLEESATTEL ET AL     3,058,218
METHODS AND MEANS FOR DRIVING SMALL DIAMETER
SHAFTS AT HIGH ROTATIONAL SPEEDS
Filed May 7, 1959     7 Sheets-Sheet 1
INVENTORS
CLAUS KLEESATTEL
LEWIS BALAMUTH
ARTHUR KURIS
Attorney

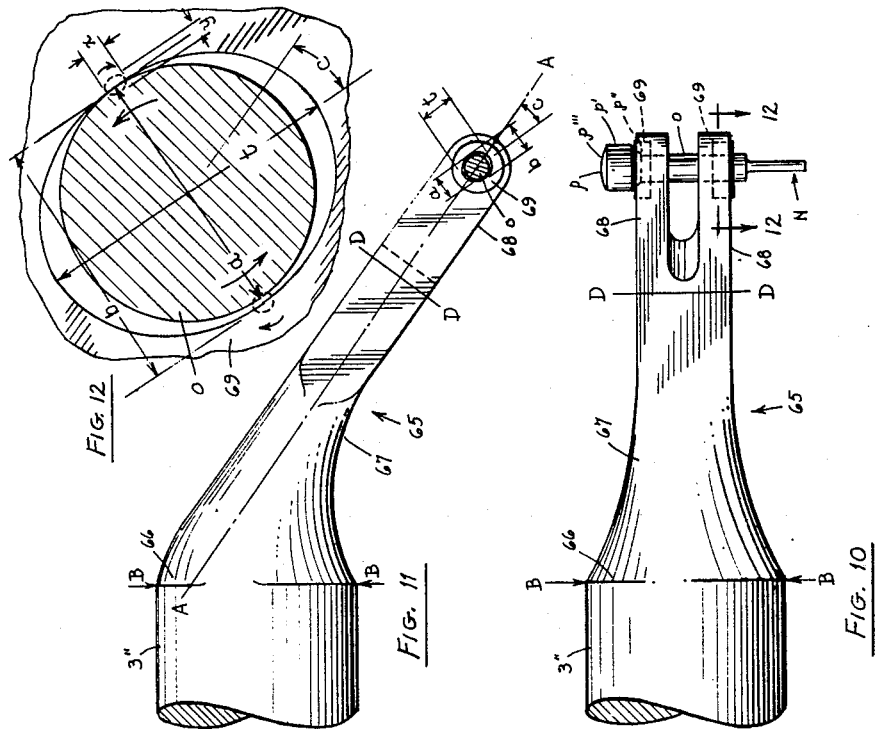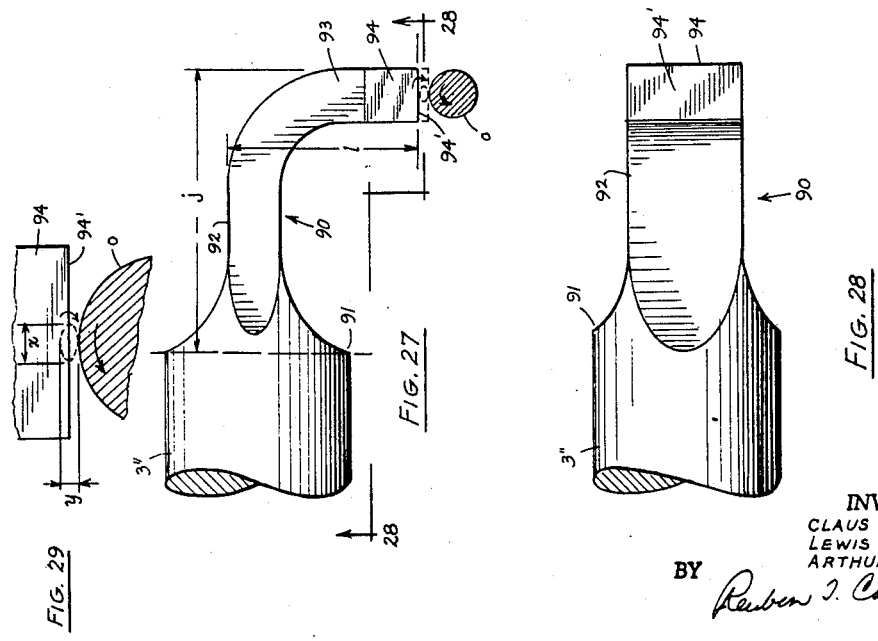

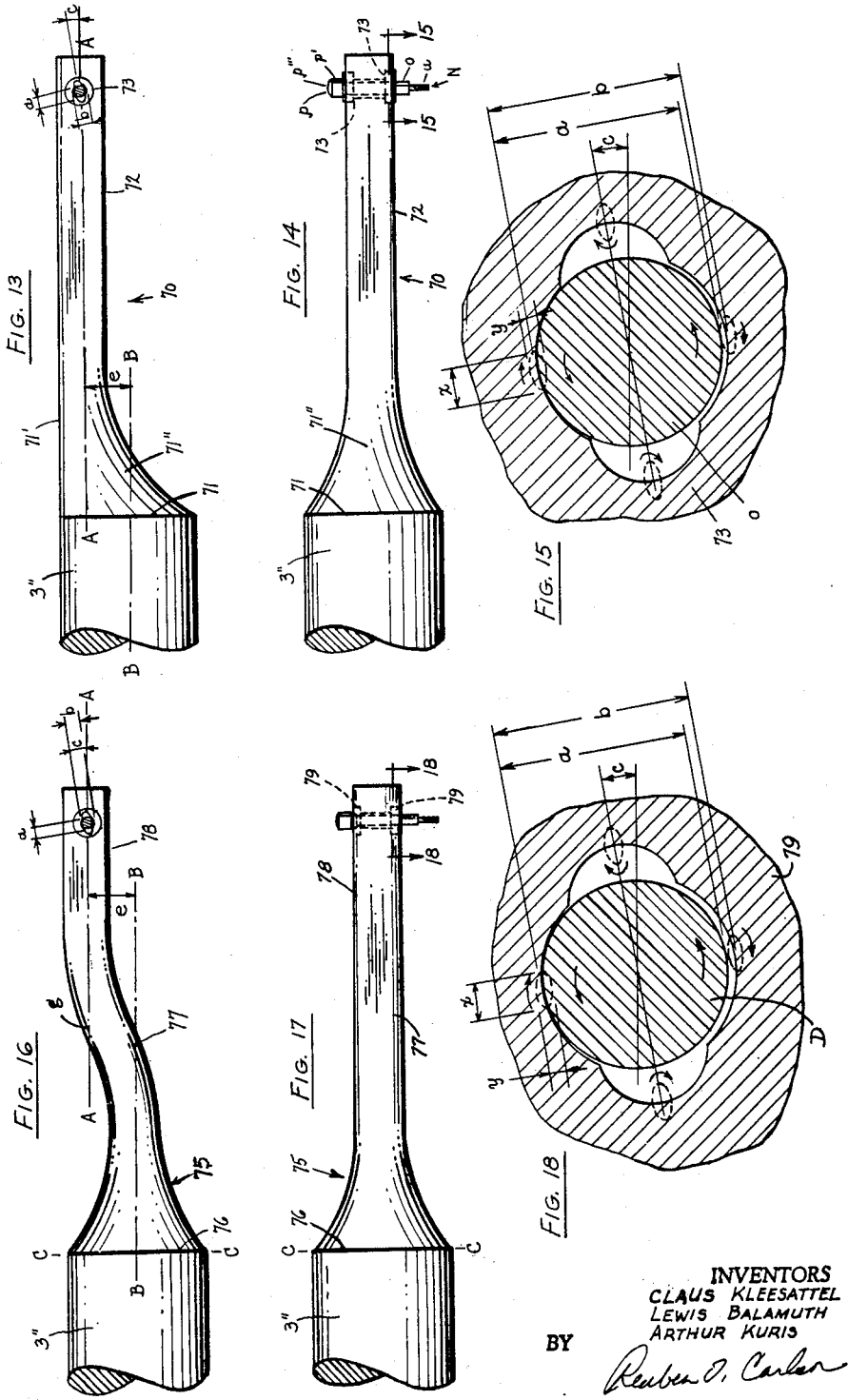

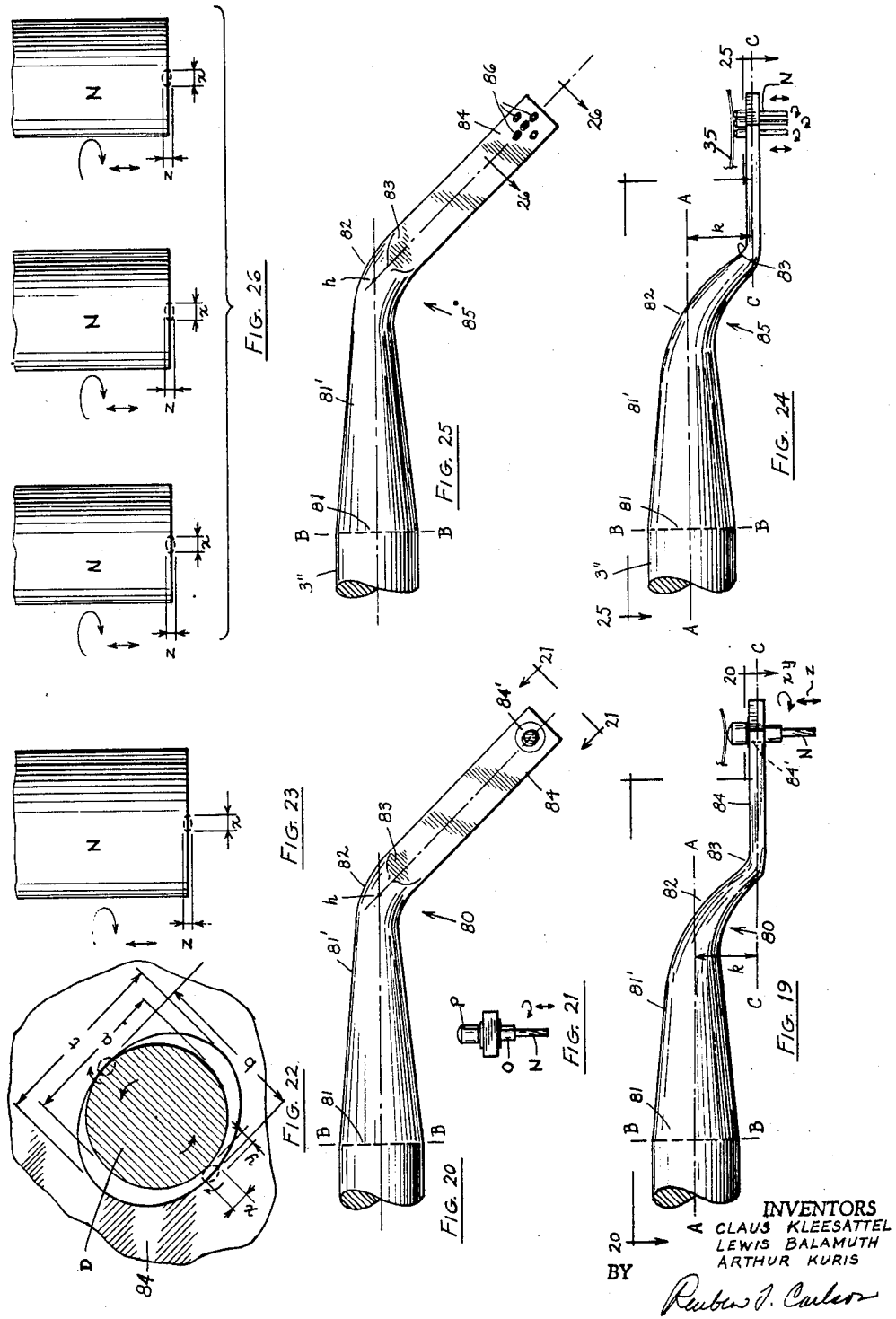

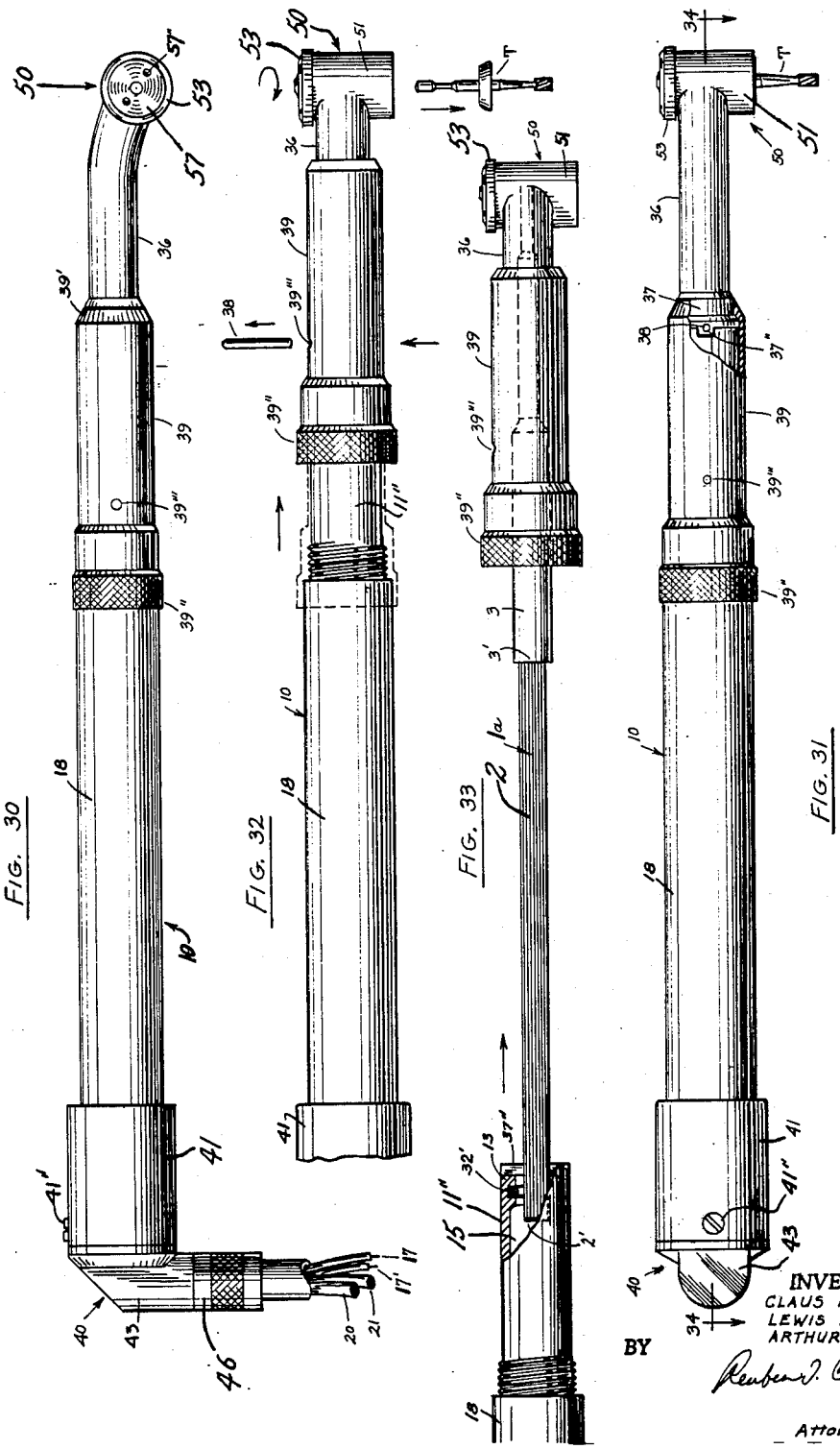

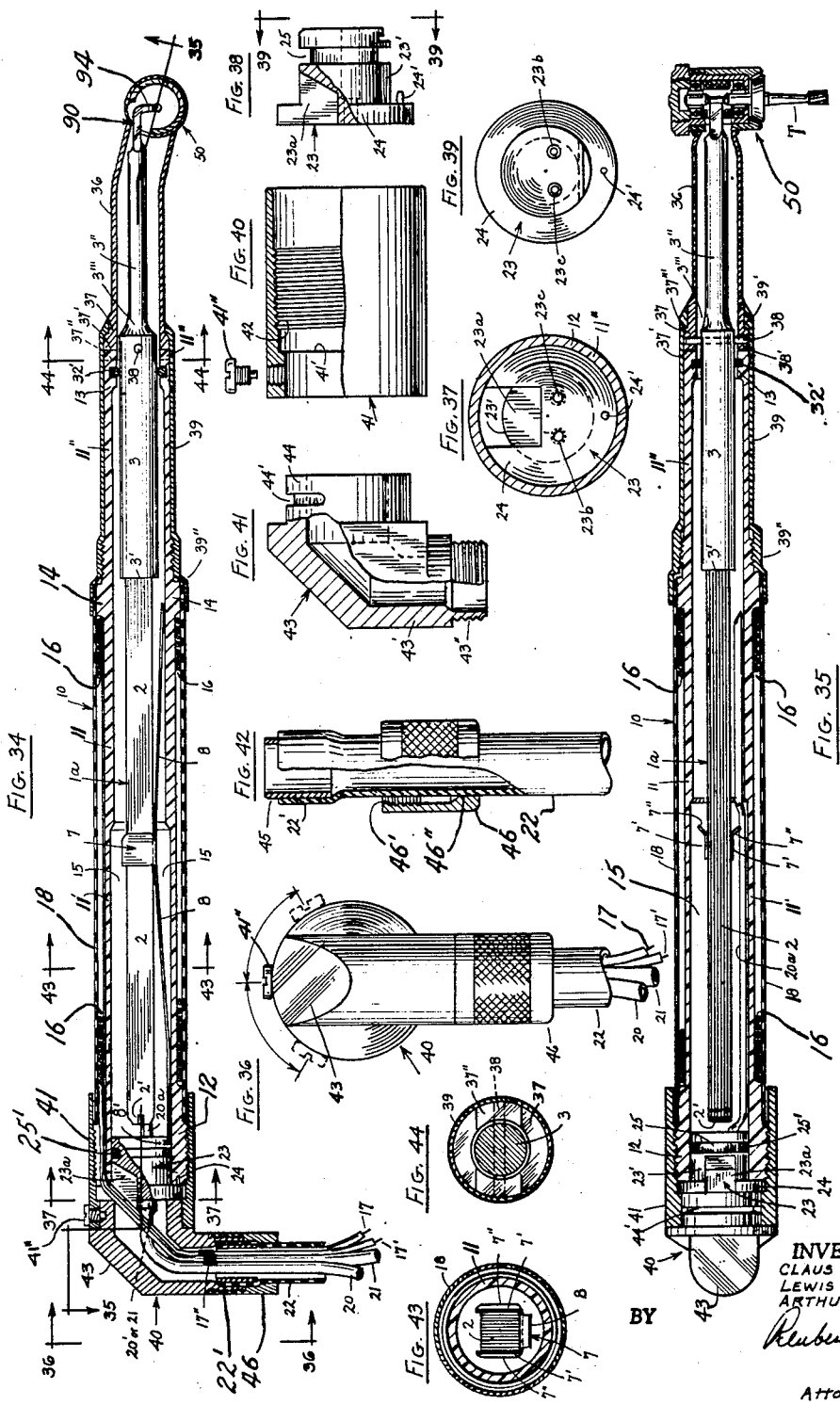

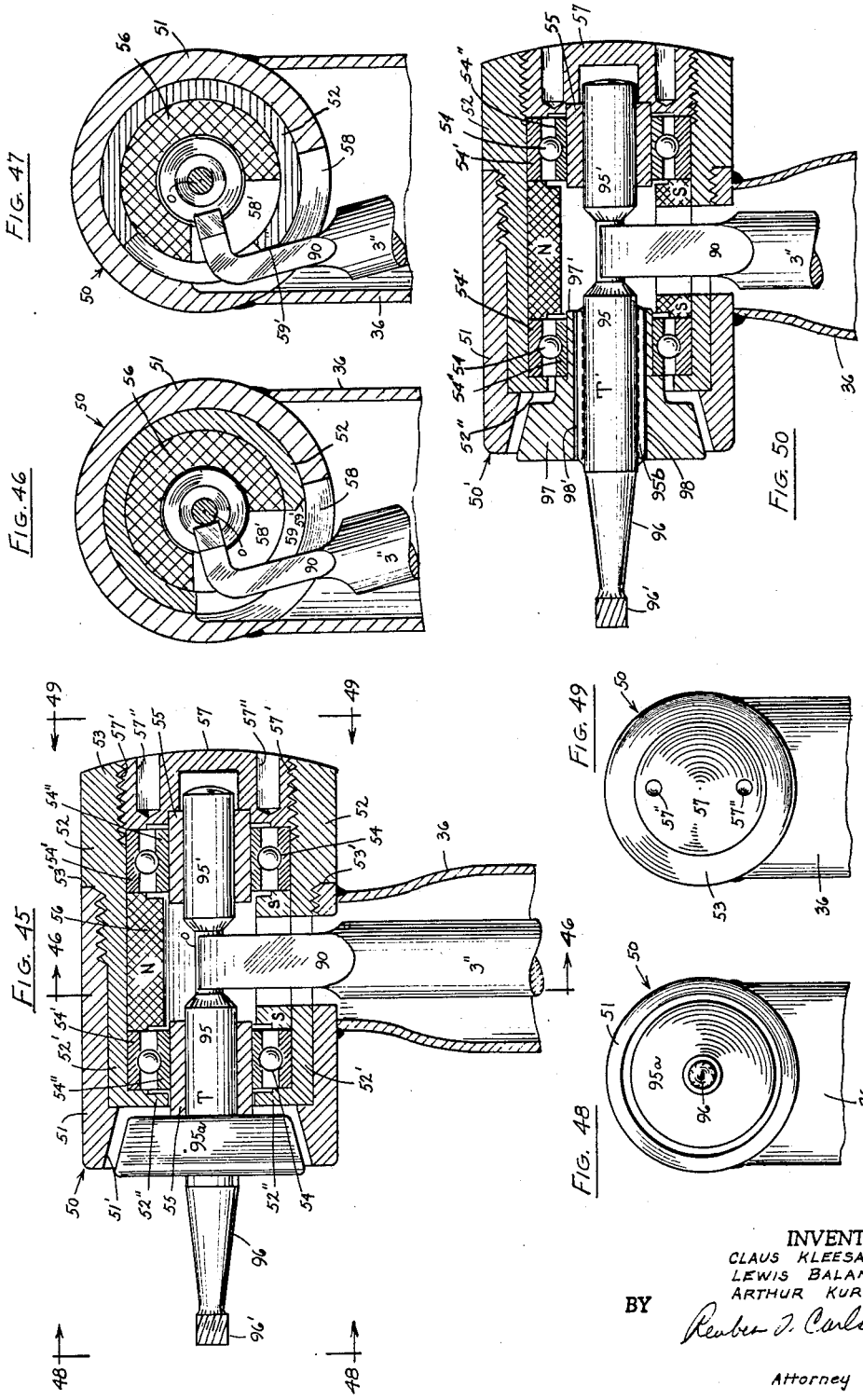

3,058,218
METHODS AND MEANS FOR DRIVING SMALL DIAMETER SHAFTS AT HIGH ROTATIONAL SPEEDS
Claus Kleesattel, Forest Hills, Lewis Balamuth, Woodside, and Arthur Kuris, Riverdale, N.Y., assignors to Cavitron Ultrasonics Inc., a corporation of New York
Filed May 7, 1959, Ser. No. 811,700
30 Claims. (Cl. 32—27)

This invention relates to methods and means for driving small diameter shafts at high rotational speeds, and more particularly to the novel application of high frequency and low amplitude vibrational energy to rotate tool stems or shafts having a circular section whose diameter is in the range of three millimeters or less, at rotational speeds in the order of ten thousand to several hundred thousand revolutions per minute.

The principles of this invention may be usefully applied to numerous cutting, piercing, drilling, abrading and polishing operations, and particularly to those operations where it is desirable and advantageous to rotate tool stems and shafts, whose working ends are designed to rapidly perform the selected operation, at uniformly high rotative speeds. More specifically, the principles of this invention may be incorporated into drilling and cutting instruments adapted to be effectively and advantageously used by dentists and surgeons in cutting and drilling teeth, bone and the like. Additionally, the principles of this invention may be incorporated into numerous forms of instruments, devices and apparatus for rotating at ultra high rotative speeds, cylindrical stems or shafts whose operating ends are designed to perform numerous types of cutting, dicing, piercing, drilling, abrading and polishing operations; as for example, tools for drilling, shaping, forming or polishing very small holes, pockets or cavities in very hard materials such as germanium, silicon, ferrite, barium titanate, tungsten carbide, boron carbide, diamonds, sapphires and the like, as used in making fine wire drawing dies or jeweled bearings; and tools for dicing, drilling, forming, shaping and polishing minute components used in electronic computers, servo-mechanisms control circuits and the like.

In the art of dental and surgical instrumentation, dental and surgical drills have been tried or are presently in use, which are powered by an air or water turbine fixed to one end of a shaft or drill stem, and whose vanes are propelled by a high velocity stream of water or air. These systems require the use of mechanisms for the production of high velocity air or water streams which are expensive to manufacture, and are cumbersome in both size and weight. The high velocity impacting force of the air or water as applied to the vanes of the turbine, places such a high strain on the turbine shaft and bearings as to preclude the use of extremely small diameter shafts and bearings. In addition, the high velocities and pressures required for the operation of air or water turbines often result in leakage problems at some point or points in the system.

In the case of the air turbine type of high speed dental drill, a high pitched noisy whine is created by the air stream to which the patient, dentist and surgeon are constantly exposed. In addition, the exhaust air from the air turbine is necessarily delivered into the patient's mouth during use, which is disturbing to the patient as well as the operating dentist or surgeon, and the air as exhausted into the mouth becomes the vehicle for the expulsion of bacteria and other small solid or liquid particles from the patient's mouth to the surrounding atmosphere. The above described disadvantages in the use of dental and surgical drilling instruments powered by air or liquid turbines, are eliminated when the method and means of this invention are used.

In accordance with this invention, the driving force applied to the circular shaft or stem of the operative tool, is developed by the generation of rapidly repeating ovaloid or elliptical cyclic motion strokes at the driving tip of a transducer assembly, in a manner to place the driving tip in tangential driving contact with the peripheral surface of the circular tool stem during a portion of each motion cycle, and thence move the driving tip out of contact with the tool stem during completion of the motion cycle.

It is also within the purview of this invention to provide a forked driving element, between which the circular tool stem is positioned, and which presents diametrically opposed driving surfaces or tips, each of which executes elliptical or ovaloid motion strokes moving in the same orbital direction, and which are alternately and tangentially applied to diametrically opposite portions of the tool stem periphery. By a proper portioning and spacing of the paired driving tips or surfaces of the forked driving element in relation to the diameter of the circular tool stem extending therebetween and in conformity with the dimensional attributes of the cyclic motion strokes designed into the transducer assembly, the tool stem may be rotatively impelled by a series of alternating stroking movements delivered tangentially to diametrically opposed sides of the stem periphery.

It is also within the contemplation of this invention to provide a driving element equipped near its terminal end with one or more circular, ovaloid or generally elliptical bearing holes in which a tool stem or stems may be rotatively supported. By a proper proportioning of the dimensional attributes of the bearing hole or holes with respect to the diameter of the circular tool stem or respective tool steams supported thereby, and in conformity with dimensional attributes of the cyclic motion strokes designed into the transducer assembly, the tool stem or stems may be rotatively impelled by a series of successive stroking contacts delivered tangentially to diametrically opposite sides of the stem periphery, or by a progressive series of tangential driving contacts applied to successive points or portions of the stem periphery.

Thus, by a series of rapidly repeating tangentially moving and frictional contacts between the driving tip or driving surface or surfaces and the cylindrical surface of the tool stem or stems, the tool stem or stems may be rotated at theoretical rotative speeds expressed by the following formula:

$$N = \frac{(S)}{(D)} f$$

in which, $N$ = Number of revolutions per second of the tool stem,
$S$ = The length of the driving stroke of the high frequency cyclic vibrations,
$D$ = The diameter of the circular shaft at the driving area,
$f$ = The number of cyclic vibrations per second executed by the driving tip.

To obtain maximum driving efficiency and uniformity in the rotative speed of the tool stem or shaft, that body portion of the tool stem or shaft whose periphery is contacted by the driving surface or surfaces of the driving element or elements, should be substantially truly circular in cross section. In applying the above formula to this invention, the diameter measurement is accordingly taken at that portion of the tool stem whose periphery is contacted by the driving surface or surfaces.

The driving tip or driving surface of the driving element should also be so vibrated that it will execute substantially uniform cyclic motion strokes which are circular, elliptical or ovaloid in form. In applying the above formula to this invention, the length of driving stroke corresponds to the length of that component of motion which extends in a direction substantially parallel to a tangent drawn at the point of contact between the driving surface or tip of the driving element and the periphery of the tool stem.

The cyclic frequency of vibration of the ovaloid or elliptical vibrations at the driving tip or surface, is a feature determined by the shape, form and characteristics of the driving assembly, and the frequency of the alternating current which energizes the transducer assembly. The ovaloid or elliptical vibrations are characterized by the cyclic frequency (i.e., number of complete ovaloid or elliptical cycles per second) executed by the driving surface of the driving element, and the velocity at each point of its ovaloid cycle. The length of the driving stroke (S) of a given driving element forming a part of a given transducer assembly, and designed to generate ovaloid or elliptical motion at the driving surface of the driving element, is intended to mean in the above formula, that axial length of that axis of the ovaloid or elliptical motion which is parallel to a tangent at the point of contact between the driving surface or tip of the driving element and the cylindrical body of the tool shaft. In general, the cylindrically bodied tool and the driving element are so designed that the largest diameter of the ovaloid or elliptical motion generated at the driving surface, extends in the tangential direction above indicated, and referred to in the above formula as the driving stroke (S).

Transducer assemblies designed in accordance with this invention are capable of being vibrated at frequencies in the order of ten thousand to fifty thousand cyclic vibrations per second ($f$) at the driving tip or surface of its driving element, and which are characterized by ovaloid or elliptical motion strokes whose driving stroke length (S) is in the range of one-quarter to one-fortieth of a millimeter. Transducer assemblies constructed in accordance with this invention are capable of rotating properly journaled tool stems or shafts whose cylindrical bodies have a diameter (D) of one millimeter or less.

When a transducer or driving assembly has been designed in accordance with this invention to produce ovaloid or elliptical motion strokes at the driving surface of its driving element at a cyclic frequency of twenty thousand cycles per second ($f$), with a driving stroke (S) of one twentieth of a millimeter or two-thousandths of an inch, and is mounted to rotate a cylindrically bodied tool having a diameter (D) of one millimeter or forty-thousandths of an inch (S), it is evident that by applying the formula $$N = \frac{(S)}{(D)} f$$

to the above measurements, that the cylindrically bodied shaft would have a theoretical maximum rotative speed of about one-thousand revolutions per second, or sixty thousand revolutions per minute (actual speed may be less than theoretical speed due to some slippage).

As another example, instruments can be made in accordance with this invention whose transducer assemblies will drive the cylindrical body of an operative tool whose body diameter (D) is only approximately one-eighth of a millimeter or five-thousandths of an inch. When the transducer assembly of this instrument is designed to generate forty thousand ovaloid or elliptical motion cycles per second ($f$) at the driving surface of its driving element, with a driving stroke (S) of one-twentieth of a millimeter or two thousandths of an inch, application of the above formula shows that the tool shaft would be rotated at a theoretical rotational speed (N) of approximately sixteen thousand revolutions per second or approximately nine hundred sixty thousand revolutions per minute.

The ultra high rotational speeds which can be achieved by the practice of the method and means of this invention, is far beyond any rotational speeds theretofore achieved in the art of high speed rotation of tool stems and shafts. The extraordinarily high rotational speeds which can be achieved by the practice of this invention makes possible the drilling, coring, puncturing, and forming of holes and pockets of substantially microscopic size both rapidly and accurately.

The use of extremely small drilling points which are substantially microscopic in diameter and measured in a few microns, is entirely practical and feasible by the practice of the method and means of this invention, because the drill point need be no longer than that required to make a hole of desired depth, and because the extremely high rotational speed of a straight drill point serves in itself to stiffen the drill point against bulging or flexure. Furthermore, the diameter of the cylindrical body of the tool need not be the same as the diameter of the cutting terminal thereof. The drive shaft diameter may be proportioned to obtain the desired rotative speed and rigidity, while the diameter of the cutting terminal of the tool may be sized as required by the small hole to be formed in the workpiece.

By the practice of this invention, it is not only possible to rotate very low inertia tool stems and shafts at extremely high speeds, but it is also possible to simultaneously vibrate the tool stem or shaft along its longitudinal axis at very high frequencies and minute amplitude, and thus provide combined rotational and reciprocating effects which greatly reduces the time for performing the drilling operation. These combined rotational and reciprocating effects are attained by the use of transducer assemblies made in accordance with this invention whose driving elements have at least two bends, designed to convert the longitudinal input vibrations into ovaloid elliptical motion cycles which have components of motion both parallel to and perpendicular to the axis of the cylindrical body of the tool.

Additionally, instruments made in accordance with this invention may incorporate a driving element designed to support a cluster of tool stems which are confined to a relatively small area of its driving end, and which can be used to simultaneously drill a multiplicity of closely nested holes, cavities or pockets in the workpiece. By the exceptionally simple means of providing a driving element whose driving end has a cluster of bearing holes designed to rotatably support a corresponding cluster of drill stems, a corresponding number of clustered holes can be simultaneously produced in hard materials at a speed of execution and with such precision accuracy as never heretofore achieved by any known means.

In addition to the numerous industrial uses to which this invention may be advantageously applied as above indicated, hand supported drilling and cutting instruments can be made in accordance with this invention designed to rotate drills and other cutting tools for drilling and cutting teeth, bone and the like, and which are driven at rotative speeds in the range of fifty thousand to two hundred fifty thousand revolutions per minute. Dental and surgical drilling instruments constructed in accordance with this invention are very light in weight, can be made with handpiece diameters which are less than one-half inch, and thus practically adapted to be held in the hand of the operating dentist or surgeon.

Such hand supported dental and surgical instruments can be provided with capillaries for the circulation of a coolant to and from the sealed transducer containing chamber of the handpiece, and may be equipped with one or more capillaries terminating adjacent the driving surface of the driving element for furnishing treating liquids to the operating area. All coolant and liquid or gaseous treating capillaries, as well as the lead wires supplying biased alternating current to the transducer section of the handpiece, may all be contained in a flexible and small diameter conduit pivotally and detachably connected to the heel end of the handpiece in a manner to facilitate manipulation of the handpiece in the hand of the operator.

Surgical and dental instruments made in accordance with this invention require a power input of only approximately one hundred watts or less, which can be produced from normal alternating utility current by a tube or transistor equipped generator which is small in size and light in weight.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof in which:

FIG. 1 is a pictorial exemplification of an acoustically powered drilling instrument made in accordance with this invention and particularly designed for drilling extremely small diameter holes, which is operative to rotate a drilling tool mounted therein at ultra high rotative speeds, and whose driving power is produced by means of a sonically or ultrasonically vibrated transducer assembly contained in a supporting housing;

FIG. 2 is a longitudinal section of the drilling instrument as the same would appear when viewed along a plane as indicated by line 2—2 of FIG. 1;

FIG. 3 is a greatly magnified top plan view of the driving element and a fragmentary part of the transformer section of the transducer assembly associated with the instrument shown in FIGS. 1 and 2, and which also shows one type of drilling tool supported for rotation at the operating end of the driving element;

FIG. 4 is a greatly magnified side view of the driving element and a fragmentary part of the transformer section of the transducer assembly as the same would appear when viewed along line 4—4 of FIG. 3;

FIG. 5 is a greatly magnified side view of only a fragmentary part of the driving element and a cross-section of the drilling tool stem as mounted therein, this exemplification illustrating one form of bearing hole which may be provided in the operating end of the driving element and which is substantially circular in shape, this view illustrating in magnified form its shape and general dimensional relation to the circular stem of the drilling tool as contained therein, this view further serving to diagrammatically illustrate the manner in which the driving element operates to rotate the tool stem;

FIG. 6 is an enlarged transverse section of the instrument as the same would appear when viewed along line 6—6 of FIG. 2, this view further illustrating the manner in which the driving assembly is non-rotatably supported within the tubular housing at the approximate area of a node of motion of the driving assembly and in a manner which does not interfere with the operating efficiency of the driving assembly;

FIG. 7 is an elevational view partly in section and greatly enlarged, of another form of drilling tool which may be rotatably mounted in the acoustically powered drilling instrument exemplified in FIGS. 1 and 2, this drilling tool being designed for use in trepanning operations and particularly designed for cutting circular sections of extremely small diameter, with or without a pierced axial hole therein, from a plate of selected hard material such as silicon, tungsten carbide, boron carbide, germanium or other hard materials as variously used in making fine jeweled bearings or delicate electrical and electronic components;

FIG. 8 is a greatly enlarged elevational view of another type of drilling or piercing tool designed to be rotated at ultra high speeds by acoustically powered instruments made in accordance with this invention, said piercing or drilling tool having a tapered terminal end designed to form chamfered, conical or tapered pockets or holes in hard materials;

FIG. 9 is a greatly enlarged elevational view of a further type of drilling tool designed to be rotated at ultra high speeds by the method and instruments of this invention, said drilling tool having a terminal end whose diameter is substantially less than the diameter of the tool stem and designed to form holes or pockets of substantially microscopic diameter in extremely hard materials such as diamonds, sapphires, tungsten carbide, boron carbide and the like;

FIG. 10 is a greatly magnified top plan view of another form of driving element adapted to be associated with the acoustically powered instrument shown in FIGS. 1 and 2, this driving element being generally similar in shape and contour to that shown in FIGS. 3 and 4, formed as an integral piece of metal and having inset bearings which provide support and drive surfaces for the stem of the drilling tool;

FIG. 11 is a greatly magnified side view of the driving element shown in FIG. 10;

FIG. 12 is a very greatly magnified sectional view of the drill stem and a fragmentary part of the driving element and its drill stem supporting hole as the same would appear when viewed along line 12—12 of FIG. 10, this view illustrating the shape and dimensional relationships between the tool stem and bearing hole and the manner in which the driving element shown in FIGS. 10 and 11 operates to rotate the tool stem;

FIG. 13 is a greatly enlarged side plan view of a further modified form of driving element which may be associated with the acoustically powered drilling instrument shown in FIGS. 1 and 2, and when acoustically powered will produce elliptical or ovaloid vibrations employed in a manner to rotate a drill stem at ultra high rotative speeds, this driving element having paired bearings mounted in the operating end thereof for rotatably supporting the tool stem;

FIG. 14 is a greatly magnified bottom plan view of the driving element shown in FIG. 13, this view further showing the shape and contour configuration of this driving element, the paired bearings at the operating end thereof, and the drilling tool supported therein;

FIG. 15 is a very greatly magnified cross-section of the drill tool stem and a fragmentary part of the driving element as the same would appear when viewed along line 15—15 of FIG. 14, this view exemplifying another shape of bearing forming hole and its dimensional relation to the drill stem which may be used, this view also diagrammatically illustrating the manner in which the driving element shown in FIGS. 13 and 14 operates the tool stem;

FIG. 16 is a greatly enlarged side plan view of a still further modified form of driving element which may be associated with the acoustically powered drilling instrument shown in FIGS. 1 and 2, and when acoustically powered will produce elliptical or ovaloid vibrations which are characterized by the shape and form of this element and employed in a manner to rotate a drill stem at ultra high rotative speeds, this driving element also having small bearings mounted in the operating end thereof for rotatably supporting the tool stem;

FIG. 17 is a greatly magnified top plan view of the driving element shown in FIG. 16, this view further showing the shape and contour configuration of this driving element, the paired bearings at the operating end thereof, and the drilling tool supported therein;

FIG. 18 is a very greatly magnified cross-section of the drill tool stem and a fragmentary part of the driving element as the same would appear when viewed along line 18—18 of FIG. 17, this view exemplifying the shape of the bearing forming hole and its dimensional relation to the drill stem which may be used, this view also diagrammatically illustrating the manner in which the driving element shown in FIGS. 16 and 17 operates to rotate the tool stem;

FIG. 19 is a greatly magnified top plan view of a further modified driving element which may be associated with the acoustically vibrated drilling instrument shown in FIGS. 1 and 2, and which is dimensionally shaped and contoured to produce not only an ovaloid or elliptical stroke which rotates the stem of the drilling tool, but also produces a component of motion in the direction of the longitudinal axis of the tool stem supported therein;

FIG. 20 is a magnified side view of the driving element shown in FIG. 19 as the same would appear when viewed along line 20—20 of FIG. 19, this view further illustrating the shape and contour of this driving element;

FIG. 21 is an end view of the driving element and drilling tool operatively mounted therein as the same would appear when viewed along line 21—21 of FIG. 20;

FIG. 22 is a very greatly magnified cross-section of the tool stem and its supporting bearing which illustrates the shape and dimensional relationships between the bearing forming hole and the circular periphery of the tool stem, this view also diagrammatically illustrating the manner in which the driving element operates to rotate the tool stem;

FIG. 23 is a very greatly magnified elevational view of the terminal end portion of the drilling tool shown in FIGS. 19-22, and which diagrammatically illustrates the high speed rotating movement of the drill stem and the longitudinal strokes engendered therein in a direction axially of the tool stem when driven by the driving element shown in FIGS. 19-21;

FIG. 24 is a greatly magnified top plan view of a still further modified form of driving element which may be associated with the acoustically powered drilling instrument shown in FIGS. 1 and 2, and whose dimensional shape and contour is similar to the driving element shown in FIGS. 19 and 20, but whose operative end is provided with a cluster of extremely small bearings each designed to support an extremely small diameter tool stem, all of which are rotated at ultra high rotative speeds and additionally vibrated in a direction parallel to the longitudinal axis of the respective tool stems by the acoustically powered driving element shown in this figure;

FIG. 25 is a greatly magnified side elevational view of the driving element shown in FIG. 24 as the same would appear when viewed along line 25—25 of FIG. 24, this view further illustrating the dimensional shape and contour of the driving element and the cluster of tools and tool stem supporting bearing holes in the end thereof which may be circular or ovaloid shaped as indicated in FIG. 22;

FIG. 26 is a very greatly magnified elevational view of the terminal end portions of the cluster of tool stems spaced along line 26—26 of FIG. 25, this view diagrammatically illustrating the ultra high speed rotational movement coupled with longitudinal movement of the tool stems in the direction of the longitudinal axis thereof, as engendered and produced by a transducer assembly which incorporates a driving element conforming to the shape and contour shown in FIGS. 24 and 25;

FIG. 27 is a greatly magnified side elevational view of an angular form of driving element which will produce elliptical or ovaloid motion strokes at the tip and thereof when acoustically vibrated by the instrument exemplified in FIGS. 30-35 and which can be employed to rotate a bearing supported tool stem at ultra high rotative speeds, this view also diagrammatically illustrating the manner in which this angular driving element operates to rotate the tool stem;

FIG. 28 is an underface view of the driving element shown in FIG. 27 as viewed along line 28—28 of FIG. 27 and which further illustrates its shape and contour attributes;

FIG. 29 is a very greatly magnified and fragmentary elevational view of the driving end of the angular driving element and a fragmentary section of the tool stem shown in FIGS. 27 and 28, this view further diagrammatically illustrating the manner in which this driving element operates to rotate the tool stem;

FIG. 30 is a pictorial exemplification of another acoustically powered drilling instrument adapted for angular type driving elements as exemplified in FIGS. 27-29, this drilling instrument being particularly adapted for dental and surgical use in which a small diameter bone or tooth drilling tool is rotated at ultra high speed by a sonically of ultrasonically vibrated transducer assembly contained within a small diameter casing shaped to provide a convenient hand piece and having a conduit connector pivotably connected to the heel end of the hand piece and through which the biased alternating current and coolant is supplied to the transducer;

FIG. 31 is a pictorial illustration of the dental and surgical drilling instrument shown in FIG. 30, as viewed from another side thereof;

FIG. 32 is a fragmentary pictorial illustration of the dental and surgical drilling instrument shown in FIGS. 30 and 31, this view showing some of the parts thereof in detached or exploded relation to illustrate the manner in which the instrument may be assembled and disassembled;

FIG. 33 is another fragmentary pictorial illustration of the dental and surgical drilling instrument in which some of the parts are shown in section, and which further illustrates some of the component parts of the instrument and the manner in which they may be assembled and disassembled;

FIG. 34 is a longitudinal section of the instrument which illustrates further structural details thereof as the same would appear when viewed along line 34—34 of FIG. 31;

FIG. 35 is another longitudinal section of the instrument as the same would appear when viewed along line 35—35 of FIG. 34, this view showing further details of its construction;

FIG. 36 is an exterior end view of the instrument as the same would appear when viewed along line 36—36 of FIG. 34, this view showing the coupling connector which is pivotally connected to one end of the hand piece casing and through which the operating current and coolant for the transducer are supplied;

FIG. 37 is a transverse section of the instrument as the same would appear when viewed along line 37—37 of FIG. 34; this view showing further details of the coupling connector;

FIG. 38 is a side view, partly in section, of the insert plug which provides a closure for the tail end of the tubular handpiece;

FIG. 39 is an inner end view of the insert plug as viewed in the direction of the arrows 39—39 of FIG. 38;

FIGS. 40, 41 and 42 are views of the several component parts of the coupling connector in exploded relation which when assembled, appear as shown in FIGS. 34, 35 and 36, and wherein: FIG. 40 is a side view partly in section of the tubular sleeve which telescopes over and is threaded to the adjacent end of the hand piece casing, FIG. 41 is a side view partly in section of the angular connector which is pivotally connected to the tubular sleeve shown in FIG. 40, and FIG. 42 is a side view partly in section of the flexible conduit and its associated expansion ferrule and tubular nipple by means of which its terminal end is detachably connected to the angular connector shown in FIG. 41;

FIG. 43 is a transverse section of the instrument as the same would appear when viewed along line 43—43 of FIG. 34;

FIG. 44 is a transverse section of the instrument as the same would appear when viewed along line 44—44 of FIG. 34;

FIG. 45 is an enlarged cross-section taken longitudinally of the drill stem supporting head of the instrument and a fragmentary part of its tubular supporting shank, and a fragmentary part of the driving element of the transducer, this view being similar to the corresponding parts shown in FIG. 35 but greatly enlarged to illustrate structural details;

FIG. 46 is a transverse section of the drill stem supporting head of the instrument as the same would appear when viewed along line 46—46 of FIG. 45, this view showing the driving element of the transducer as it would appear when in drill stem driving position;

FIG. 47 is another transverse section of the drill stem supporting head as the same would appear when viewed along line 46—46 of FIG. 45, this view showing the driving element of the transducer as it would appear when laterally swung out of driving contact with the drill stem to permit convenient removal of the drill stem from the driving head of the instrument;

FIG. 48 is an end view of the driving head as the same would appear when viewed in the direction of the arrows 48—48 of FIG. 45;

FIG. 49 is an end view of the opposite end of the driving head of the instrument as the same would appear when viewed in the direction of the arrows 49—49 of FIG. 45; and FIG. 50 is a fragmentary section of a modified form of drill stem supporting head which is generally similar to the head structure shown in FIG. 45, except that the balancing fly wheel forms a permanent part of one of the bearings of the driving head as shown in FIG. 50, and is not attached to the removable drill stem as shown in FIG. 45.

Similar reference characters refer to similar parts throughout the several views of the drawings and specification.

To illustrate one of the many types of vibratory devices and instruments into which the principles of this invention may be incorporated, FIGS. 1 and 2 disclose an instrument which comprises a tubular housing 10 which may be sized and dimensioned to provide a handpiece adapted to be held in the hand or fixed to a suitable support, and which contains a driving or transducer assembly 1. The housing 10 contains a tubular casing 11 in which a substantial part of the transducer assembly 1 may be contained. The tubular casing 11 may be made from a molded plastic such as molded nylon or the like, whose tail end has an external and enlarged diameter boss portion 12 and whose opposite end may have an internal abutment portion 13 formed as an integral part thereof. The tubular casing 11 may also be provided with an intermediate external and enlarged diameter boss portion 14 integrally formed as a part of the casing body. The interior of the tubular casing 11 has a smooth bore which provides an unobstructed passage for the insertion of its transducer assembly 1 through the head end thereof, and which additionally provides an internal chamber 15 in which a coolant can be circulated.

The tubular casing 11 supports a winding 16 of current conducting wire such as copper or the like, which may be protected by enamel coating, and which may be wound around the body of the casing to extend between the intermediate boss portion 14 and the boss portion 12 at the tail end of the casing. The winding 16 is enclosed and protected by a tubular jacket 18 which may be composed of a strong and tough synthetic plastic. The ends of the tubular jacket 18 may telescope over and be supported by the adjacent boss portions 12 and 14 of the casing 11 as shown in FIG. 2. The tubular casing 11 is formed of a plastic material which does not impede the establishment of an alternating electromagnetic field in the interior chamber 15 thereof as produced by the exterior winding 16.

The interior of the tubular casing 11 is formed to provide a sealed chamber 15 to which a suitable coolant may be supplied by an intake duct or capillary 20 and from which warm coolant may be withdrawn through an exit duct or capillary 21. The coolant supply and exit ducts 20 and 21 are made of sufficient length to extend from an exterior coolant supply reservoir and coolant supply pump and water supply (not shown) and the lead wires 17—17′ from the winding 16 led to a biased alternating current generator (not shown) which supplies biased alternating current of the desired frequency and voltage characteristics to the winding 16. The coolant supply and exit ducts 20 and 21 as well as the lead wires 17—17′ are contained in a flexible insulating conduit 22 which leads to the tail end of the tubular casing 11.

The tail end of the tubular casing 11 is closed by removable insert plug 23, as shown in FIGS. 2 and 38, which may be integrally molded or formed from natural or artificial rubber or suitable plastic compounds. The sealing plug 23 presents a cylindrical body portion 23′ designed to snugly telescope into the adjacent end of the tubular casing 11, and which terminates in a circular flange portion 24 designed to snugly abut against the adjacent terminal end of the tubular casing 11 as shown in FIG. 2. The body portion 23′ of the insert plug 23 is provided with a peripheral groove 25 designed to receive a resilient sealing ring 25′ which has sealing contact with the interior wall surface of the tubular casing 11. The body portion 23′ and adjacent flange portion 24 of the insert plug 23 have a tapered segmental notch 23a as shown in FIG. 2 and through which the winding lead wires 17—17′ extend.

A coolant entry port and coolant exit port extend longitudinally through the sealing plug 23 and into which the terminal nipples 20′—21′ of the coolant inlet and outlet ducts 20 and 21 may be detachably connected. The inlet duct 20 has a tubular extension 20a made of metal or plastic which extends from the coolant inlet port of the sealing plug 23 for a substantial distance into the interior chamber 15 of the casing 11 as shown in FIG. 2. A suitable coolant is supplied from an exterior source through the coolant supply duct 20, and is thus conducted a substantial distance into the interior of the coolant chamber 15 to provide adequate circulation of coolant therein before it is withdrawn through the coolant exit port of the insert plug 23 and thence through the exit duct 21.

The flexible insulating conduit 22 may be detachably connected to the tail end of the tubular casing 11 by means of a tubular connecting sleeve 26 and a closure cap 27. The connecting sleeve 26 has a tubular body 26′ which is internally threaded for detachment and attachment to the threaded exterior surface of the adjacent boss portion 12 of the tubular casing 11. The connecting sleeve 26 may also be provided with an end wall 26″ having a hole therein through which the lead wires 17—17′ and capillary ducts 20 and 21 extend. The end wall 26″ of the sleeve 26 is preferably spaced from the outer end of the insert plug 23 to provide a pocket which contains the detachable connectors 17″ for the lead wires 17—17′ and detachable nipples 20′—21′, by means of which the terminal ends of the ducts 20 and 21 may be connected to the inlet and outlet ports of the insert plug 23.

The terminal end of the flexible conduit 22 is detachably connected to the sleeve 26 by a closure cap 27 having a tubular flange 27′ which is internally threaded for application to the exterior threads of the sleeve 26, and which is provided with an end closure wall 27″ which may be shaped and formed to grip and hold the terminal end of the conduit 22.

To provide support for the transducer assembly 1 at a nodal area thereof, and to permit ready removal and insertion of the transducer assembly from and into the tubular casing 11, a tubular clamping member 30 may be applied to the head end of the tubular casing 11 as shown in FIG. 2. The tubular clamping member 30 has a tubular body 30' which may have a length to protectively enclose a further part of the transducer assembly not contained within the tubular casing 11. The tubular clamping member 30 has an outwardly flaring tail portion 31 which presents a flat exterior face 31' and a tapered camming face 31" as shown in FIG. 2.

The driving assembly 1 may desirably be provided with a polygonal shaped supporting flange 4 as shown in FIGS. 2 and 6, which may be formed as an integral part of the connecting body 3 thereof, and which is positioned at or adjacent to a node of vibration thereof. The insert assembly 1 is telescoped into the interior chamber 15 of the tubular casing 11 as shown in FIG. 2, and one flat face of the supporting flange 4 snugly seats against the adjacent flat face 13' of the internal boss portion 13 at the head end of the casing 11. The polygonal flange 4 is snugly pocketed within an adjacent rim extension 19 of the casing 11 whose inner surface is of the same polygonal shape and size as the polygonal supporting flange 4, thereby preventing the transducer assembly from turning in the casing 11. A resilient sealing ring 32 is snugly telescoped over the adjacent body area of the connecting body 3 and has a sealing fit therewith. The tail portion 31 of the tubular clamping member 30 may then be telescoped over the exterior portion of the connecting body 3 and its flat exterior face 31' brought into abutment against the sealing ring 32.

The tubular clamping member 30 is maintained in assembled relation with respect to the tubular casing 11 by means of a tubular sleeve member 33 presenting a tubular body portion 33' which snugly telescopes over an adjacent portion of the casing 11 and which terminates in a knurled capping head 33" which is internally threaded for application to the external threads of the intermediate boss portion 14 of the casing 2. The tubular member 33 is provided with an internal collar portion 34 at the other end thereof, which presents an inclined camming face designed to be brought into camming engagement with the tapered camming face 31" of the tubular clamping member 30 as shown in FIG. 2. By turning the caping head 33" of the tubular sleeve member 33 a sufficient number of turns, the sealing ring 32 will be clamped between the supporting flange 4 of the transducer assembly 1 and the flat exterior face 31' of the outwardly flared tail portion 31 of the clamping member 30, to thereby secure the clamping member 30 to the casing 11 by the camming action of the camming face of the collar portion 34 as applied against the camming face 31" of the tail portion 31 of the clamping member 30. The transducer assembly is also thereby firmly supported in operative position, with the casing contained part thereof out of contact with the interior wall of the tubular casing 11. In addition, the sealing ring 32 provides a leak-proof seal for the head end of the casing 11, with the sealed coolant chamber 15 defined between the supporting flange portion 4 of the transducer assembly and the sealing plug 23 at the tail end of the casing.

The motion generating transducer or driving assembly 1 may be formed as an integral member and includes a transducer section 2 which is caused to vibrate at high frequency and low amplitude when subjected to the influence of a corresponding high frequency alternating electromagnetic field as supplied by the winding 16. The longitudinal vibrations thus generated at one end of the transducer section 2, are transmitted to an acoustical impedance transformer section 3 rigidly fixed to one end thereof. The transformer section 3 operates to magnify the longitudinal vibrations transmitted thereto to a higher value, as determined by its shape and form and the material from which it is made.

A driving element, rigidly connected to the end of the transformer section 3 or integrally formed therewith, receives the magnified longitudinal vibrations transmitted to it by the transducer section 2, and converts the magnified longitudinal vibrations into a combination of longitudinal and flexural vibrations which emerge at its driving end as elliptical or ovaloid motion strokes. The form and shape of the elliptical or ovaloid motion cycles produced at the driving tip, is determined by the asymmetrical shape, form and construction of the driving element and the metallic material from which it is made, as hereafter more fully explained.

The transducer section 2 of the driving assembly may be any one of a number of electrical mechanical types, such as electrodynamic, piezoelectric or magnetostrictive. However, at the preferred operating frequency in the order of ten thousand to fifty thousand cycles per second, the transducer section 2 is preferably of the magnetostrictive type. The magnetostrictive transducer section may be formed of a metal such as permanickel, nickel, permendur or other metals which have high tensile strengths and are highly magnetostrictive in character, so that the transducer section will longitudinally vibrate to a maximum degree when subjected to the influence of an alternating electromagnetic field as established by a biased alternating current supplied by a winding in surrounding relation to the transducer section.

In the preferred form of the invention, one end of the transducer section 2 is rigidly fixed to an acoustical impedance transformer 3 which provides a connecting body between the transducer section and the driving element. The transformer section should be made of a strong metal such as steel, Monel metal, titanium, Phosphor bronze, brass or beryllium copper or the like having high tensile strength. The transducer section 2 of the driving assembly should have a length corresponding to one-half wave length or multiples thereof at the vibration frequency of the transducer section, and the transformer section 3 combined with the driving element should also have a length corresponding to one-half wave length or multiples thereof at the vibration frequency of the transducer section.

The velocity amplitude of the driving assembly 1, and the diameter of the drill stem or shaft with which the driving element thereof makes tangential driving contact during its elliptical or ovaloid motion strokes, are factors which determine the rotative speed of the drill stem. The maximum velocity amplitude at which the driving assembly may be vibrated is determined by the endurance limit of the material from which the driving assembly is composed. The endurance limit for a material such as Monel metal is thirty thousand p.s.i. (2,000 kg. per sq. cm.), while the alloy Berylco 25 has an endurance limit of over forty-five thousand p.s.i. (3,000 kg. per sq. cm.). For continuous operability of the driving assembly, it is desirable that the peak stress produced therein during vibration should be less than the endurance limit of the material from which the driving assembly is composed.

A conservative value for maximum velocity amplitude, as applied to vibratory driving assemblies made in accordance with this invention, is in the order of five hundred centimeters per second.

Peak velocity amplitude may be expressed by the formula: $V = \pi f S$ in which, $V$ = Peak velocity amplitude,
$f$ = The cyclic frequency of cyclic vibration at the driving surface of the driving element,
$S$ = The length of the driving stroke of the high frequency cyclic vibrations.

Peak velocity amplitude ($V$) is proportional to the orbital frequency ($f$) multiplied by the length of the driving stroke ($S$). This product ($f \times S$) above, together with the diameter ($D$) of the cylindrical tool shaft, determines the number of revolutions per second ($N$) of the shaft. For a given transducer assembly, the frequency ($f$) is effectively constant, while the driving stroke ($S$) may be varied from zero up to a peak value as determined by the endurance limit of the material from which the transducer assembly 1 is composed. By controlling the power input to the transducer 2, the cylindrically bodied tool can be rotated at any rotational speed up to the maximum determined by the peak velocity amplitude attainable within the endurance limit of the metal from which the transducer assembly is made.

It is convenient to think in terms of peak velocity amplitude, since this concept applies no matter what the frequency of operation of the driving assembly is. For example, to operate at a higher frequency, the driving stroke (S) will be correspondingly limited, so that the product of frequency (f) multiplied by driving stroke (S) corresponds to the peak velocity amplitude (V) referred to above. By establishing a safe operating theoretical velocity amplitude, the peak peripheral speed of the circular shaft driven in accordance with this invention can be determined. The empirical formula for the peripheral speed of a rotating shaft is:

Peripheral speed (P.S.)$=\pi \times N \times D$; where $N$=Revolutions per second (r.p.s.) of the shaft,
$D$=Diameter of the shaft.

Since the theoretical peripheral speed (P.S.) is equal to the peak velocity amplitude (V), a known peripheral speed may be substituted for peak velocity amplitude (V), in the formula ($V=\pi f S$), yielding the following equation:

$$N \times D \leqslant f \times S$$

or $$N \leqslant (S/D) \times f$$

This is the theoretical coupling formula for determining the maximum rotational speed of a shaft when driven by a vibrator having a specified velocity amplitude. (The actual rotational speed of the shaft may be somewhat less than the computed maximum due to slippage.) As an example, if a shaft diameter (D) of 1 mm. is driven at 30,000 cycles per second (f), with a driving stroke (S) equal to .05 mm. (the peak velocity amplitude (V) and rotational speed (N) of the shaft being theoretically equal as above indicated), it is evident that when the above measurements are applied, that N may approach (.05/1) multiplied by 30,000 equals 1,500 r.p.s., or 90,000 r.p.m. From the same data, the peak velocity is 3.14×30,000× .005, or 471 cm. per second, which falls well within the recommended peak velocity amplitude of 500 cm. per second.

If the diameter of the shaft is reduced to .25 mm., the same transducer driving assembly operating at the same velocity amplitude, could be used to rotate the smaller shaft of .25 mm. diameter at close to 360,000 r.p.m. and remain within safe velocity amplitude limits. Thus, it is clear that within safe velocity amplitudes of 500 cm. per second for readily available metallic materials, and with drill shafts of 1 mm. diameter or less, ultra high rotational drilling speeds are readily attainable.

Before considering the importan shape and dimensional characteristics of the various driving elements which form an integral part of the transducer or driving assembly 1, as exemplified by the driving element 60 shown in FIGS. 3 and 4; the driving element 65 shown in FIGS. 10 and 11; the driving element 70 as shown in FIGS. 13 and 14; the driving element 75 as shown in FIGS. 16 and 17; the driving element 80 as shown in FIGS. 19 and 20; the driving element 85 as shown in FIGS. 24 and 25; and the driving element 90 shown in FIGS. 27-29, a clearer understanding thereof may be reached if the various types and kinds of operating tools which can be associated therewith are first examined, as exemplified by the rotary drilling tools shown in FIGS. 3, 7, 8 and 9.

In all of the examples to follow, the dimensions of the driving ovaloids or ellipses will be given with reference to the driving stroke axis $x$; the axis $y$ which is perpendicular to axis $x$ and whose length indicates the maximum distance the tool tip is out of contact with the circular driven body $o$ of the tool stem; and axis $z$ which extends parallel to the longitudinal axis of the tool stem.

The rotary drilling tool K shown in FIG. 3, the rotary dicing and piercing tool L shown in FIG. 7, the rotary conical pocket forming tool M shown in FIG. 8, and the extremely small pointed rotary drilling tool N shown in FIG. 9, all present a shaft or stem section at least a portion of which presents a cylindrical body $o$ with which the driving element is in vibratory contact. In most applications of this invention, the cylindrical body $o$ would have a diameter not exceeding three millimeters, and may have a diameter of one millimeter or less. The cylindrical body $o$ is preferably composed of a metallic or other material having high tensile strength and wear resistance, such as various carbides, aluminum oxide and various hardened steel alloys. A metal found to be particularly suitable for forming the cylindrical bodies $o$ is known as "Ottawa 60 Steel" (a product of Allegheny Ludlum).

The head section $p$ of each of these tools may be removably but rigidly attached to one end of its cylindrical body $o$, or may be formed integral therewith. Each head section $p$ preferably has an enlarged diameter body $p'$ which presents a tapered or conical neck $p''$ whose bearing face seats against the complementary bearing seat provided at the vibratory end of the driving element. The head section $p$ of each of these tools also presents a hemispherical or semi-conical end face $p'''$ against which the terminal end of a leaf spring 35 or the like is in pressure bearing contact, and which may be secured as by a screw 35' to the clamping tube 30 as shown in FIG. 1, and which serves to maintain the tapered neck $p''$ of the tool in seated position against the adjacent bearing face of the driving element during high speed rotation of the tool.

Each of the head sections $p$ is preferably composed of a material of high tensile strength and wear resistance such as boron carbide, aluminum oxide or "Ottawa 60 Steel." The metals or materials used to form the head section $p$ and cylindrical body $o$ of these tools should be featured by minimum density as well as maximum wear resistance. A material of minimum density is advantageous in keeping the total mass inertia of the drill to a minimum, so that the tool will responsively follow the vibrations of the driving element.

The cutting tip $r$ of the tool shown in FIG. 3 may possess substantially the same diameter as the cylindrical body of the tool and may be formed of the same material. Its outer surface may be provided with helical cutting blades or barbs $r'$ for more effective cutting, and which may be separated by intervening flutes or channels $r''$ to facilitate removal of detritus material from the hole drilled in the workpiece and to supply a liquid coolant or an abrasive slurry to the bottom of the workpiece hole being formed.

The dicing tool L shown in FIG. 7 presents a tubular cutting wall $s$ formed integral with its cylindrical body $o$, and designed to cut or dice out small diameter discs from hard workpieces. This tool may also be provided with an axially extending piercing points $s'$ which serves to bore a very small axial hole in the circular workpiece. This tool tip may also be provided with one or more very small supply and reliever holes $s''$ extending from the cavity defined by the circular cutting wall $s$ to the outer face of its cylindrical body $o$, and which provide channels for the removal of detritus material cut from the workpiece and to supply a coolant or abrasive slurry to the workpiece being cut.

The tool M shown in FIG. 8 presents a conical cutting tip $q$ formed integral with its cylindrical body $o$, whose conical surface may or may not be fluted to provide appropriate cutting blades as indicated by the particular coning operation to be performed.

The tool N shown in FIG. 9 has a terminal tip $u$ which may be formed of extremely fine diameter wire for drilling extremely small holes which may measure only a few microns in diameter. This fine wire tip $u$ may be formed from material such as tungsten which is brazed to the end of its cylindrical body $o$. This fine wire tip $u$ may or may not be provided with helically extending grooves.

All of the operative tools K, L, M and N above described, made to appropriate size and dimension, are designed to be mounted in the bearing hole or holes extending through the vibratory end portion of the driving elements illustrated in FIGS. 3–5, in FIGS. 10–12, in FIGS. 13–15, in FIGS. 16–18, in FIGS. 19–23 and in FIGS. 24–26.

The acoustical impedance transformer section or connecting body 3 has two cylindrical portions referred to as the head portion 3′ and the reduced diameter stem portion 3″ joined to the head portion by a tapered neck portion 3‴ as shown in FIG. 2. One end of the head portion 3′ is rigidly secured as by brazing to the adjacent end of the transducer section 2, and the total length of the connecting body 3 taken together with the driving element connected to the other end thereof should be approximately equal to one-half wave length or multiples thereof at the frequency at which the transducer assembly 1 is vibrated and the characteristics of the material from which the connecting body and driving element are made.

The supporting flange 4 is desirably formed integral with the connecting body 3 and is positioned at approximately the node of longitudinal motion of the connecting body 3. The connecting body 3 is preferably generally cylindrical, and when made in the form and shape shown in FIG. 2 and above described, will substantially increase the longitudinal driving stroke delivered to it by the transducer section 2, so that the output end of the reduced diameter stem portion 3″ will impart longitudinal stroking vibrations to the heel end of the driving element in the form of longitudinally or axially extending vibratory strokes which may be two or more times the length of the longitudinal input strokes delivered to the connecting body at the head or input end thereof.

The driving element 60, which is shown in FIG. 2 as attached to the output end of the stem portion 3″ of the connecting body 2, and greatly magnified in FIGS. 3, 4 and 5, presents a heel portion 61 which is brazed to the output end of the stem portion 3″ of the connecting body 3 or formed integral therewith, and thence tapers uniformly into the stroking portion 62 thereof. A pair of stroking plates 63 are soldered or brazed to the sides of the stroking portion 62 to provide an extension of the stroking portion 62 of the driving element 60. The spaced stroking plates 63 may be made of a very hard material such as tungsten carbide, and present aligned bearing holes 64 of substantially circular form at the outer end thereof as shown in FIGS. 4 and 5.

The driving element 60 as shown in FIGS. 3, 4 and 5, and fixed to a connecting body 3 as shown in FIG. 2, has been successfully operated in accordance with the principles of this invention, and illustrates one form of driving element which can be used. The over-all length of the bent portion of the driving element 60 measured along the center line A—A of FIG. 4 was 11.2 mm., with the center line A—A of the driving element inclined to the longitudinal axis of the connecting body 3 at an angle of 35 degrees. The heel end of the driving element 60 measured along line B—B as shown in FIG. 4 was approximately 5 mm. in diameter, and the shape, lengths and cross-sectional areas of the stroking portion 62 and stroking plates 63 were proportionally dimensioned substantially as shown in FIGS. 3 and 4.

The coaxial circular holes 64 which supported the tool stem measured 0.52 mm. in diameter, designated by $b$ in FIG. 5, and the interior surface thereof provided the driving surface of the driving element. One of the holes 64 was provided with a polished chamfer 64′ providing a bearing seat for the conical neck $p″$ of the drilling tool. Since the bearing holes 64 are subjected to substantial wear, they should be made of very hard material, and in this instance the plates 63 were accordingly made of a very hard grade of tungsten carbide. Grade AA tungsten carbide is suitable. The inserted drill stem, subjected to less wear than the bearing holes, was in this experiment formed of hardened steel whose circular body $o$ had a diameter of 0.5 mm., designated by $a$ in FIG. 5.

The driving element 60 illustrated in FIGS. 3, 4 and 5 was driven by a transducer assembly operating at 28,000 cycles per second. The orbital motion, producing rotation of the circular body $o$ of the drilling tool, had a driving stroke $x$ of 0.015 mm., as shown in FIG. 5, and the circular body $o$ of the drilling tool was rotated at 750 revolutions per second, or 45,000 revolutions per minute. Since the bearing hole 64 was substantially circular, with a diameter ($b$) of 0.52 mm. as compared to the diameter ($a$) of 0.50 of the tool stem, the bearing hole 64 made progressive driving contact with the peripheral surface of the tool stem as indicated in FIG. 5 during each of its orbital motion cycles.

The driving element 65 shown in FIGS. 10–12 is integrally formed from the same piece of metal and possesses substantially the same shape, form and dimensional attributes as the driving element 60 shown in FIGS. 3, 4 and 5, and above described. The driving element 65 presents a heel portion 66 which tapers uniformly into a stem portion 67 which terminates in a pair of drill stem supporting fork portions 68 having aligned bearing holes therein. The center line A—A of this driving element 65 may be in the order of approximately 11.2 mm. long, with this center line A—A inclined to the longitudinal axis of the connecting body 3 at an angle of 35 degrees. The base end of the driving element 65 as taken along line B—B may be approximately 5 mm. in cross-section, and thence tapers uniformly into the stem portion 67, so that the stem portion has a cross-section taken approximately along line D—D of FIG. 10 of approximately 2.5 mm. by 1.6 mm., with the terminal end of each fork portion 68 having a cross-sectional area of .8 mm. by 1.6 mm.

In this instance, paired bearings 69 are inserted into the fork portions 68 to provide support for the circular body $o$ of the tool shaft, and these bearings can be made of such wear resistant bearing materials as diamond, sapphire, a hard grade if tungsten carbide, or the like. The bond between the bearings 69 and the members 68 may be produced with any good adhesive, for example, those of the epoxy family. The inner bearing surfaces of the paired bearings 69 may have a generally elliptical shape as shown in FIG. 12, with the longer axis $t$ of the elliptical bearing surface approximately 1 mm. in length and the shorter axis $b$ approximately 0.77 mm. in length. The cylindrical body $o$ of the tool stem may be composed of hardened steel, with a diameter $a$ of approximately 0.75 mm. With a driving frequency of 28,000 cycles per second, the resulting rotational speed delivered by the bearings 69 to the drill stem under dimensional proportions $x$ equals .025 mm. and $y$ equals .015 mm. (where $x$ is the driving stroke), was approximately 810 revolutions per second, or 48,600 revolutions per minute.

The driving element 70 illustrated in greatly magnified form in FIGS. 13–15, and shaped as therein indicated, is capable of translating longitudinal vibrations delivered to the heel portion 71 thereof into ovaloid or elliptical motion strokes at the outer end of its stem portion 72. As shown in FIGS. 13 and 14, the heel portion 71 has a substantially straight side 71′, with the other three sides 71″ thereof generally curvilinear or tapered in shape, and which merge into the stem portion 72 which is substantially of uniform cross section throughout its length. It will be noted that the longitudinal axis A—A of this driving element is asymmetrical to the longitudinal axis B—B of the connecting body 3, and is displaced therefrom a distance $e$ of approximately 1.5 mm. The total length of the driving element 70 may be approximately 16 mm., the base end of the heel portion 71 may have a diameter of 5 mm., and the terminal end of the stem portion 72 may have a square cross-section in the order of approximately 1.56 mm. by 1.56 mm.

A pair of small sapphire or diamond bearings 73 are set into the outer end of the stem portion 72 and provide support for the cylindrical body of the tool stem. The bearing surface of these bearings 73 may be shaped as indicated in FIG. 15. The bearing hole in each of these bearings 73 may have a length $b$ of .535 mm. as shown in FIG. 15, when the diameter of the cylindrical body $o$ of the tool stem is .50 mm. shown in FIG. 15 as $a$. With a driving frequency of 28,000 cycles per second, the orbital driving motion is in the form of an ellipse, of which the longer axis or driving stroke $x$ of the ellipse was 0.035 mm. and the shorter axis $y$ was 0.025 mm. The resultant observed rotational speed (N) of the tool body $o$ was 1,800 revolutions per second, or 108,000 revolutions per minute.

The driving element 75 exemplified in magnified form in FIGS. 16–18, has a bend offset therein shaped and formed as shown in these figures. The heel portion 76 of this driving element has a diameter measured along line C—C of approximately 5 mm., and the total length of the driving element 75 is approximately 16 mm. The tapered heel portion 76 merges into an intermediate bent or offset portion 77 which joins a relatively straight tip portion 78. The intermediate portion 77 and tip portion 78 are substantially uniform in circular cross-sectional area, with the output end of the terminal portion 78 having a diameter of 2 mm. The longitudinal axis A—A and the center of gravity of the tip portion 78 is offset and displaced from the longitudinal axis B—B of the connecting body 3 by a distance $e$ of 1.5 mm. The point of inflection $g$ of the intermediate portion 77, as indicated in FIG. 16, is spaced a distance 8 mm. from the cross-sectional line C—C at the base end of the tapered portion 76.

A pair of jeweled bearings 79 are inset into the tip portion 78 near the terminal end thereof, and their inner surfaces provide the bearing support for a tool stem. The inner bearing surface of the jeweled bearings 79 as measured along line $b$ of FIG. 18 should be approximately .78 mm. when the diameter of the circular body of the driving shaft supported thereby is .75 mm. The shaft supporting bearings 79 as thus mounted in a driving element 75 formed as shown in FIGS. 16–18, and dimensioned as above described, executes orbital motion in the form of an elongated ellipse as shown in FIG. 18. When driven at a frequency of 28,000 cycles per second, the $x$ axis of the driving ellipse shown in FIG. 18 is approximately .030 mm. and the other axis $y$ of the driving ellipse is approximately 0.012 mm. With a driving vibration (N) of 28,000 cycles per second, the tool shaft mounted in a driving element 75 as shown in FIGS. 16–18 was rotated at 1,100 revolutions per second, or 66,000 revolutions per minute.

The driving element 80 as shown in magnified form in FIGS. 19–23, and the driving element 85 as shown in magnified form in FIGS. 24–26, are similar in shape, form and dimensional construction, except that the terminal portion of the driving element 80 has only a single bearing hole to receive a single tool stem, while the terminal portion of the driving element 85 has a cluster of very small bearing holes which support a cluster of tool stems. Both of these driving elements 80 and 85 have a double bend therein, and include a heel portion 81 fixed to the adjacent end of the connecting body 3 and whose base diameter as taken along line B—B is approximately 3.8 mm. The heel portion 81 uniformly tapers into a primary intermediate offset portion 82, which in turn uniformly tapers into a secondary offset portion 83, and which in turn uniformly tapers into a relatively straight tip portion 84.

The axial length of that portion of the driving elements 80 and 85 which extends between the base end B—B to point $h$ as shown in FIGS. 20 and 25, which is at the center of the primary and secondary bend portions 82 and 83, is approximately 9.5 mm., while the distance from the point $h$ to the terminal end of the tip portion 84 is approximately 8.9 mm. The longitudinal axis C—C of the tip portion 84 is offset a distance $k$, as shown in FIGS. 19 and 24, with respect to the longitudinal axis A—A of the connecting body 3, and wherein the distance $k$ is approximately 2.54 mm. The area of the terminal end of the tip portion 84 is 1.5 mm. by .75 mm.

The double bend driving elements 80 and 85 are particularly shaped, formed, dimensioned and designed to produce ovaloid or elliptical motion strokes which operate to rotate the tool shaft. In the exemplification shown in FIG. 22, the observed orbital motion ellipse produced along the longer axis $x$ of the ellipse was approximately 0.030 mm. and along its shorter axis $y$ was approximately 0.024 mm. These ovaloid or elliptical motion strokes operate to rotate the tool shaft. In addition, the driving elements 80 and 85 operate to vibrate the terminal ends of their tip portions 84 in a direction $z$ which is parallel to the longitudinal axis of the tool stem supported thereby, with an observed length of the stroke $z$ of approximately 0.006 mm.

The tip portion 84 of the driving tool 80 is provided with a bearing hole 84' which may be formed by a pair of jeweled bearings whose inner surface is shaped as shown in FIG. 22. For a tool shaft diameter of .5 mm., the generally ovaloid or elliptical bearing hole may have a shorter axis diameter $b$ of .53 mm. and a longer axis diameter $t$ of .75 mm., or more or less.

The observed elliptical motion strokes delivered at the driving surface of the driving elements 80 and 85, when vibrated at a frequency of 28,000 cycles per second, showed that the elliptical motion strokes were oriented in the same direction as shown in FIG. 22, with the longer axis $x$ of the ellipse equal to 0.030 mm. and its shorter axis $y$ equal to 0.024 mm., with delivered longitudinal strokes $z$ parallel to the axis of the tool stem about .006 mm. long. With these dimensional attributes, and with an input vibration frequency of 28,000 cycles per second, the tool shaft was observed to rotate at 1,450 revolutions per second or 87,000 revolutions per minute, and had a reciprocating stroke $z$ in the direction parallel to the axis of the tool shaft of about 0.005 mm.

The driving element 85 shown in FIGS. 24–26 has the same form, shape and dimensional characteristics as the driving element 80 illustrated in FIGS. 19–23 and above described, and will therefore not be repeated. The tip portion 84 of the driving element 85 has a cluster of extremely small bearing holes 86 at the operating end thereof, a cluster of five such bearing holes being shown in FIGS. 24 and 25, each designed to respectively receive and support five tool shafts each of which may have a diameter as low as .25 mm. or less. Where the respective tool shafts each have a diameter of .25 mm., the corresponding driving hole 86 may have a substantially circular inner bearing surface whose diameter is .28 mm.

The bearing surface of each hole 86 executes an elliptical driving orbit whose longer axis $x$ equals .030 mm. and whose shorter axis $y$ equals .024 mm., and whose longitudinal driving stroke along the axis $z$ as shown in FIG. 26 equals .006 mm. When the driving element 85 was vibrated at 28,000 cycles per second, it was observed that each of the cylindrical body portions $o$ of each drill stem was rotated at 3,200 revolutions per second, or 192,000 revolutions per minute, and that the reciprocatory stroke $z$ extending parallel to the axis of the tool stem itself was .004 mm. for each of the respective clustered tools.

The driving element 90 illustrated in magnified form in FIGS. 27–29, provides an excellent driving element for association with the transducer assembly 1 of a dental and surgical instrument of the type illustrated in FIGS. 30–50, and which will presently be described in further detail. The driving element 90 as actually used was made of beryllium copper and as shown in FIGS. 27 and 28 presents a heel portion 91 of circular section whose base end is bonded to or integral with the output end of the stem portion 3″ of the connecting body 3 as shown in FIGS. 34 and 35. The base end of the heel portion 91 has a diameter of 3.7 mm., and thence merges into a longitudinally extending stem portion 92 with a gradual taper.

The longitudinal stem portion 92 was connected to an output portion 93 extending substantially at right angles to the longitudinal stem portion 92 and connected thereto by a 90 degree bend as shown in FIG. 27. The output end of the output portion 93 was capped by a very high wearing material such as a titanium carbide tip 94 whose facial extremity 94′ provided the driving surface or tip. It is evident that the tip forming cap 94 may also be made of other extremely high wear resistant materials, such as tungsten carbide, a sapphire, a diamond, or the like. The longitudinally extending stem portion 92 and the output portion 93 merged therein may be circular or generally rectangular in cross-section. In the instance shown, the tip forming cap 94 presented a rectangular driving surface 94′ whose dimensional area was 2.3 mm. by 1 mm. The driving element 90 shown in FIGS. 27, 28 and 29 has a longitudinal length as measured along the line $j$ of FIG. 27 of 6 mm., and its output portion 93 had an over-all vertical length as indicated by dimension $l$ in FIG. 27 of 3.5 mm.

A hardened steel drill T or T′ shaped as shown in FIGS. 45–47, was inserted into the operating head of the instrument shown in FIGS. 30–50. This steel drill had a diameter of 1 mm. at its circular body in the area of contact with the driving tip surface 94′ of the driving element 90. It was observed that the orbital motion at the driving surface 94′ of its driving tip 94 produced elliptical driving strokes as illustrated in FIG. 29 whose longer axis $x$ equaled .042 mm. and whose shorter axis $y$ equaled .011 mm. When the transducer assembly 1 was driven at a frequency of 26,000 cycles per second, a rotational speed of the drill stem was observed equal to 950 revolutions per second, or 57,000 revolutions per minute.

The exemplifications above described and detailed in the accompanying drawings conform to actual tests and observations made, and are here supplied for the purpose of illustrating the wide range of ultra high speed revolutions which can be attained, including reciprocal motion strokes compounded with the orbital motion strokes. It is also evident from the above description that the driving element is in all cases asymmetrical to the longitudinal axis of the connecting body to which it is rigidly or integrally attached and that numerous other asymmetrical shapes and forms of driving elements may be made and used to produce orbital, ovaloid and elliptical motion strokes, with or without compounded longitudinal strokes, and which can be empirically built into the driving element and the transducer assembly with which it is associated.

Tool shaft supporting bearing holes, provided at the operating end of the driving elements above described, which are generally elliptical or irregular in cross sectional form as shown in FIGS. 12, 15, 18 and 22, are easier to maintain, subject the tool shaft to less wear, are subjected to lesser mechanical stress, and require less power than tool shaft bearing holes which are circular in form as shown in FIG. 5.

The principles of this invention can be advantageously embodied into an ultra-high speed drilling instrument useful in both dentistry and surgery for drilling teeth, bone and other hard structures. Dental and surgical instruments exemplified and constructed as shown in FIGS. 30–50 of the patent drawings are shaped to provide a hand piece 10 which is small in diameter, light in weight and easily and conveniently manipulated in the hand of the dentist or surgeon. This instrument is particularly designed to support and rotate numerous different types and kinds of drills and puncturing tools at rotative speeds in a range of fifty thousand (50,000) revolutions per minute or less, to two hundred and fifty thousand (250,000) revolutions per minute or more.

This dental and surgical drilling instrument essentially comprises a tubular handpiece 10 sized to be conveniently held in the hand of an operator and whose driving head 50 contains a bearing assembly 54 designed to receive and rotatably support the stem of a removable drilling or puncturing tool of any desired shape or form. The handpiece 10 contains a tubular casing 11 into which a removable transducer or driving assembly 1a is inserted, and which may advantageously comprise a magnetostrictive vibrator section 2, one end of which is rigidly joined to an acoustical impedance transformer or connecting section 3 whose output end may be rigidly connected to a driving element 90 of the type illustrated in detail in FIGS. 27–29, and which is so designed, shaped and proportioned that the driving end 94 of the driving element 90 executes the desired ovaloid or elliptical motion strokes as above described, and which provides the driving force for rotating the drilling tool. The tubular housing 10 contains and supports a biased alternating current winding 16 which supplies the magnetomotive force which acoustically vibrates the magnetostrictive section of the driving assembly.

The current supply wires 17—17′ connected to the winding 16 as shown in FIG. 34, are contained in a flexible insulating conduit 22 which is pivotally joined to the heel end of the tubular casing 11 by an angular connecting assembly 40 which is angularly swingable in a manner to avoid any interference with the manipulation of the handpiece 10 in the hand of the operator. The flexible conduit 22 and associated angular connector assembly 40 also contain coolant ducts or capillaries 20 and 21 which supply a coolant to the sealed chamber 15 within the tubular casing 11 of the handpiece to thereby maintain the transducer section 2 of the driving assembly 1a and the handpiece 10 as a whole, in cooled condition.

As shown in FIGS. 34 and 35, the handpiece 10 contains a tubular casing 11 preferably formed from a molded plastic such as nylon or the like, and which presents an elongated tubular body section 11′ and an end extension 11″ integral therewith, whose inner facing wall is relatively smooth and unobstructed. The tail end of the tubular body section 11′ presents an exterior enlarged diameter boss portion 12 to which the connector assembly 40 is detachably secured. The juncture between the tubular section 11′ and end extension 11″ of the tubular casing 11 presents an intermediate exterior boss portion having an abutment edge 14′ which is complementary to the abutment edge of the boss portion 12 at the heel end of the casing.

The body section 11′ of the tubular casing 11 supports a winding 16 of current conducting wire such as copper or the like which may be protected by an enamel coating, and whose terminal wires 17—17′ are threaded through a longitudinal slot formed in the boss portion 12 of the casing as shown in FIG. 34. The winding 16 is enclosed and protected by a tubular jacket 18 which may be composed of a plastic composition such as Hyflex plastic. One end of the jacket 18 telescopes over a part of the boss portion 12 at the tail end of the casing 11, and the other end telescopes over a part of the intermediate boss portion 14 of the casing and is supported thereby. The tubular casing 11 is formed of a plastic material which does not impede the establishment of an alternating electromagnetic field within its chamber 15, as produced by the exterior winding 16.

The interior of the tubular casing 11 provides a chamber 15 to which a suitable coolant is supplied by an intake duct or capillary 20, and from which the warmed coolant is withdrawn through an exit duct or capillary 21. The coolant supply and exit ducts 20 and 21 are made of sufficient length to extend to a stationary coolant supply reservoir and coolant circulating pump or water supply (not shown), and the lead wires 17—17' from the winding 16 lead to a biased alternating current generator (not shown) and which supplies current of the desired operating characteristics to the winding 16. The coolant supply and exit ducts 20 and 21, as well as the lead wires 17—17', are contained in the flexible insulating conduit 22 which leads to the handpiece 10.

The tail end of the tubular casing 11 is closed by a removable insert plug 23 which may be integrally molded or formed from natural or artificial rubber or suitable plastic compound. The sealing plug 23 as shown in FIG. 38 presents a cylindrical body portion 23' designed to snugly telescope into the adjacent end of the tubular casing 11, and has a circular flange portion 24 designed to snugly abut against the adjacent terminal end of the tubular casing 11 as shown in FIGS. 34 and 35. The flange portion 24 may be provided with a projecting registry pin 24' which seats within corresponding hole extending longitudinally into the adjacent end of the tubular casing 11. The body portion 23" of the insert plug 23 is provided with a peripheral groove 25 designed to receive a resilient sealing ring 25' which has sealing contact with the interior wall surface of the tubular casing 11. The body portion 23' and adjacent flange portion 24 of the insert plug 23 have a tapered segmental notch 23a shown in FIGS.. 34, 35, 37, 38 and 39, and through which the winding lead wires 17—17' extend.

A coolant entry port 23b and a coolant exit port 23c extend longituidnally through the sealing plug 23 and in which the terminal nipples 20'—21' at the ends of the coolant inlet and outlet ducts 20 and 21 may be detachably inserted. The inlet duct 20 has a tubular extension 20a made of metal or plastic which extends from the coolant inlet port 23b of the sealing plug 23 for a substantial distance into the tubular chamber 15 of the casing 11 as shown in FIG. 35. A suitable coolant supplied from an exterior source through the coolant duct 20 is thus conducted a substantial distance into the interior coolant chamber 15 of the casing 11 to provide adequate circulation of coolant therein before it is drawn through the coolant exit port 23c of the insert plug 23 and thence through the exit duct 21.

The flexible tubular conduit 22 is detachably connected to the boss portion 12 of the tubular casing 11 by the angular connector assembly 40 whose structural features and parts are illustrated in FIGS. 34, 35, 36, 40, 41 and 42. The connector assembly 40 generally comprises a tubular connecting sleeve 41 which is adapted to be detachably secured to the tail end of the handpiece 10, and an angular coupling 43 which is pivotally connected to the tubular connecting sleeve 41, and which is in turn connected to the terminal end 22' of the supply conduit 22 by a tubular expansion ferrule 45 and locking collar 46 in a manner to provide a tight joint therebetween.

The angular coupling 43 as shown in FIG. 40 is designed to be pivotally connected to the tubular connecting sleeve 41 shown in FIG. 40, and to have an angular swing in the order of approximately 180 degrees. The angular coupling 43 may be integrally molded from a strong and durable plastic such as nylon and presents an angular shaped tubular body portion 43' which presents an angular passage through which the lead wires 17—17' and the coolant supply and exit ducts 20 and 21 extend. The angular body portion 43' has a tubular neck extension 44 which presents a peripheral groove 44' having an arcuate length of approximately 180 degrees. The other end of the body portion 43' presents a threaded nipple extension 43" into which the terminal end 22' of the tubular conduit 22 is inserted.

The terminal end 22' of the flexible tubular conduit 22 is expanded by the insertion therein of a rigid tubular ferrule 45 as shown in FIGS. 34 and 42, and the thus expanded terminal end 22' of the conduit 22 is then snugly inserted into the tubular nipple extension 43" of the angular coupling 43. A strong coupling joint is assured by the application of a locking collar 46 which telescopes over the flexible conduit 22, and is provided with internal threads 46' which are threaded onto the external threads of the nipple extension 43" of the angular coupling 43. The locking collar 46 has an inturned shoulder 46" which is brought into adjacent relation to the terminal end of the tubular ferrule 45 so that the adjacent wall portion of the conduit 22 is clamped therebetween when the locking collar 46 is fully applied. The exterior body of the locking collar 46 may be suitably knurled so that it can be readily finger manipulated.

The tubular connecting sleeve 41 as shown in FIGS. 34, 35 and 40 is designed to telescope over the boss portion 12 of the tubular casing 11 and is provided with internal threads 42 so that the sleeve member 41 may be fixedly but detachably connected to the exterior threads of the boss portion 12. The tubular sleeve member 41 also presents an internal abutment shoulder 41' designed to be brought into abutment against the exterior face of the flange portion 24 of the stationary insert plug 23. A threaded screw 41" is threaded into corresponding threaded hole extending radially through the tubular sleeve member 41 as shown in FIGS. 36 and 40, leaving the screw head thereof exposed for convenient manipulation. The screw 41" is provided with a terminal stud portion designed to track in the arcuate groove 44' formed in the cylindrical neck extension 44 of the angular coupling 43. The angular coupling 43 may thus be swung through a radial angle of approximately ninety to one hundred and twenty degrees or more, as indicated in FIG. 36.

The pivoting connector assembly 40 as thus constructed is formed from relatively few simple parts which can be quickly assembled and disassembled, and provides a functional means for connecting the flexible supply conduit 22 to the handpiece 10 in a manner so that the supply conduit 22 does not interfere with the convenient manipulation of the instrument when the dentist or surgeon operates upon a patient.

The transducer or driving assembly 1a as shown in FIGS. 34 and 35, and which operates to rotate the drilling tool at selectively determined high rotating speeds, is preferably made in the form of a removable insert which is removably telescoped into the tubular casing 11 of the handpiece 10. The driving assembly 1a may be generally similar to the transducer assembly 1 previously described and presents a transducer section 2 whose free end is positioned adjacent to but out of contact with the insert plug 23 at the tail end of the handpiece 10 when in operative position, with the winding 16 in surrounding relation thereto. One end of the transducer section 2 is rigidly fixed as by brazing solder to a connecting body 3 which operates as an acoustic impedance transformer. A driving element, such as the driving element 90 previously described, is rigidly fixed to the outer end of the connecting body 3 as by brazing or a threaded stud. The driving assembly 1a is thus composed of three main sections bonded together in integral assembly and removably insertable into the tubular casing 11, so that only a part of the connecting body or section 3 and the driving element 90 are exterior to the head end of the casing 11 when the driving insert is in operating position.

The connecting body 3 presents a head portion 3' and a stem portion 3" of smaller diameter than the head portion 3' and integrally joined thereto by a tapered neck portion 3''' as shown in FIGS. 34 and 35. The connecting body 3 is desirably in axial alignment with the transducer section 2, and its larger diameter head portion 3' is integrally joined as by brazing solder to the adjacent end of the transducer section 2, and desirably only a part of the stem portion 3" thereof extends beyond the terminal end of the tubular casing when the driving assembly 1a is in operating position as shown in FIGS. 34 and 35.

The transducer section 2 of the driving assembly 1a shown in FIGS. 34 and 35 may be any one of a number of electromechanical types, such as electrodynamic, piezoelectric, or magnetostrictive. However, at the preferred operating frequency of 10,000 to 50,000 cycles per second, the transducer section 2 is preferably of the magnetostrictive type. The magnetostrictive transducer section 2 is preferably formed of a metal, such as permanickel, nickel, permondur or other metals which have high tensile strengths and are highly magnetostrictive in character, so that it will vibrate to a maximum degree when subjected to the influence of the alternating electromagnetic field as established by the biased alternating current supplied with the winding 16.

In the form of the invention shown in FIGS. 34 and 35, the transducer section 2 comprises a stack of thin strips of selected metal whose adjacent head ends are secured together by an inset slug 2' inserted into a slot cut transversely across the stacked plates and brazed within the slot as with silver solder. The inset slug 2' as brazed to the free end of the stack gives the stacked plates the necessary rigidity so that they will not separate during handling of the driving assembly 1a.

The magnetostrictive transducer section 2 may also be formed from a bundle of metal wires or rods, preferably of rectangular cross-section so that they can be compactly assembled together; or a roll of metal foil; or in the form of a split hollow metal tube. The length of the magnetostrictive transducer section 2 is made to conform to a half wave length or multiples thereof, at the frequency of vibration of the surrounding alternating electromagnetic field as established by the winding 16.

The acoustic impedance transformer 3 provides a connecting body between the transducer section 2 and the driving element and may be secured together by brazing. The transformer section 3 may be made of a strong metal such as steel, Monel metal, titanium, Phosphor bronze, brass, beryllium copper and the like. The transducer section 2 and the transformer section 3 of the driving element as above described may also be integrally formed of the same metal by making the transducer section 2 in the form of a split metal tube of selected metal, and by making the head portion 3' of the transformer section 3 as a hollow cylinder with the stem portion 3" thereof as a hollow tube or solid rod. The longitudinal slot in such a split tube transducer-transformer assembly, serves to eliminate or reduce eddy currents therein.

The transformer section 3 and the driving element may be integrally formed, or may be separately formed from different metals with the driving element bonded to the end of the transformer section 3. The transformer section or connecting body 3 and the driving element should have a combined length corresponding to one-half wave length or multiples thereof at the vibration frequency of the transducer section.

It is desirable to support the entire driving assembly 1a within the tubular casing 11 at approximately a node or nodes of motion thereof. As shown in FIGS. 34 and 35, the head end of the end extension 11" of the tubular casing 11 presents an internal boss portion 13 which has an internal circular groove therein and which receives a sealing ring 32' which has sealing contact with the head portion 3' of the connecting body 3 at approximately a node of longitudinal motion thereof.

To further support the driving assembly 1a in a manner to maintain the driving surface 94' of its driving element 90 in orbital driving contact with the tool shaft body o, a resilient saddle member 7 of U-shaped form may be positioned within the casing 11 and which presents a pair of opposite resilient positioning legs 7' which telescope over the body of the transducer section 2 at approximately a node of longitudinal motion thereof. The positioning legs 7' may be made of very thin metal which may be strengthened by providing each leg with an outwardly flared lip 7" as shown in FIG. 35. The U-shaped saddle member 7 presents a pair of longitudinally extending arms 8 in the form of spring steel leafs and whose terminal ends are designed to seat against the inside surface of the tubular casing 11. One of these longitudinal arms 8 may be provided with an upturned lip 8' which seats in a small notch formed in the body portion 23' of the adjacent inset plug 23 to thereby hold the U-shaped saddle member 7 in fixed position. When the U-shaped saddle member 7 is placed at the node of longitudinal motion of the transducer section 2, it will not interfere with the efficiency of vibration of the transducer or driving assembly 1a.

The drill stem supporting driving head 50 is rigidly connected to and supported by a tubular shank 36 as shown in FIGS. 34 and 35 which presents an external boss portion 37 at the tail end thereof. The boss portion 37 presents a flat end face 37' designed to snugly seat against the flat end face of the adjacent end extension 11" of the handpiece casing 11. To prevent rotation of the tubular shank 36 with respect to the casing 11, the tail end of the shank 36 and the adjacent head end of the casing extension 11" may be provided with one or more pairs of snugly interfitting notches and lugs 37" formed in the adjacent ends of the tubular walls thereof, as shown in FIGS. 31, 34 and 44.

A locking pin 38 extends through the head portion 3' of the connecting body 3 adjacent the node of longitudinal motion thereof, and whose projecting ends extend through aligned holes 38' extending diametrically through the external boss portion 37 of the tubular shank 36 of the driving head 50. The locking pin 38 thus provides a pivot which prevents relative rotation between the external tubular shank 36 of the driving head and the driving assembly 1a, and since the pin 38 is located at approximately the node of longitudinal motion of the connecting body 3, the pin 38 does not impair the driving efficiency or vibratory performance.

The tubular shank 36 of the driving head is also rigidly secured to the handpiece casing 2, with the flat end face 37' of the tubular shank 36 in snug pressure abutment against the adjacent flat end face of the end extension 11" of the casing 11, by means of a telescoping sleeve 39 as shown in FIGS. 30–35. The sleeve 39 has an internal boss portion 39' at the head end thereof which presents an inclined camming face designed to cam against the adjacent camming face 37'" of the external boss portion 37 of the driving head supporting shank 36. The telescoping sleeve 39 is designed to snugly telescope over the end extension 11" of the casing 11, and is provided with an enlarged diameter tail extension 39" internally threaded to engage the external threads presented by the end extension 11" of the casing 11. The enlarged diameter tail extension 39" may also be externally knurled as shown in FIGS. 30–33 for finger grip removal and attachment thereof.

Where an angular driving element 90 as shown in FIGS. 27 and 28, 34 and 35 is employed as a part of the driving assembly 1a, it is important that its driving tip or surface 94' of small area be maintained in resilient but accurate driving relation to the circular body o of the drill stem to be driven thereby. Since the drill stem is rotatably supported by the driving head 50 and its tubular shank 36, it follows that the tubular shank 36 must not only be rigidly but detachably secured to the handpiece casing 11, but the circular body o of the drill stem supported thereby must also be maintained in resilient driving relation to the driving surface 94' of the driving element 90, and yet permit convenient assembly and removal of the integral driving assembly 1a. This is accomplished by the resilient arms 8 and pin 38 as above described.

In further explanation, it will be noted that the resilient arms 8 of the saddle member 7 and the resilient sealing ring 32' maintain the longitudinal axis of the driving assembly 1a against lateral movement, so that the driving surface 94' of the driving element 90 is maintained in resilient driving relation to the circular body $o$ of the drill stem in a direction perpendicular to the axis of the circular body $o$. The locking pin 38 pivotally holds the driving assembly 1a and the driving surface 94' of its driving element 90 against rotational and longitudinal movement and so that the driving surface 94' of the driving element 90 is in precise longitudinal relation to the circular body $o$ of the tool stems to be driven thereby, when these parts are assembled as above indicated.

To permit attachment and detachment of the driving head shank 36 to and from the tubular casing extension 11", the telescoping sleeve 39 may be finger turned from the position shown in FIG. 30 to the position shown in FIG. 32. The telescoping sleeve 39 has a hole 39''' extending diametrically therethrough, as shown in FIGS. 30 and 32 and which can be turned into alignment with the locking pin 38, so that the locking pin 38 can then be driven out as shown in FIG. 32 to permit removal of the driving head supporting shank 36 from the handpiece of the instrument. The entire driving assembly 1a can then be withdrawn from the handpiece casing for repair and replacement, or the substitution of another driving assembly having a driving element of different form.

The driving head 50 as shown in FIGS. 34 and 35 and in enlarged detail in FIGS. 45–50 is designed to support a drilling or cutting tool T whose stem or shaft presents a pair of spaced bearing portions 95—95' designed to be supported in roller bearing assemblies. The stem or shaft presents a circular driven body $o$ between the bearing portions 95—95' with which the driving surface 94' of the driving element 90 makes driving contact. The circular body $o$ of the drill stem is proportionately sized to insure the desired rotative speed for the tool when under the driving influence of the driving assembly 1a and associated driving element. The circular body $o$ may be of larger or smaller diameter than the bearing supporting portions 95—95' of the drill stem or shaft, as indicated in FIGS. 45–50.

One of the bearing supporting portions 95 of the tool stem may have a fly wheel or balancing disc 95a formed integral therewith as shown in FIG. 45. The drill stem has a shaft extension 96 whose terminal end portion presents a cutting tip 96' shaped and formed to best perform the desired cutting or drilling operations, such as a drilling or cutting tip suited to drill teeth or bone.

The drilling head 50 has a tubular housing 51 which forms an integral part of the tubular head supporting shank 36, and may be secured thereto as by welding or brazing. The tubular housing 51 has a tapered mouth forming boss portion 51' whose inner diametrical shape is such as to provide a pocket for the balancing disc 95a of the tool stem.

A bearing supporting sleeve 52 has a tubular body portion 52' which is designed to snugly telescope into the tubular housing 51, and is externally screw threaded for application to internal threads presented by the tubular housing 51. The body portion 52' of the bearing sleeve 52 presents an inwardly extending bearing retaining flange 52" at one end thereof. The other end of the tubular body portion 52' presents an enlarged head portion 53, whose exterior diameter may be the same as the exterior diameter of the tubular housing 51, with the head portion 53 presenting an abutment shoulder 53' designed to abut against the adjacent end of the tubular housing 51 when fully applied thereto.

The bearing supporting sleeve 52 contains a pair of spaced ball bearing assemblies 54 whose outer raceways 54' snugly fit within the bearing supporting sleeve 52, and whose inner raceways 54" provide support for a pair of self-lubricating bushings 55 through which the drill stem extends. The bearing sleeve 52 also contains a permanent magnet ring 56 which is positioned between the bearing assemblies 54 and whose interior surface is spaced from the drill stem to provide a pocket for lubricant therebetween. The permanent ring magnet 56 serves to attract any metallic dust or fragments, which may be worn from the drill stem or the driving surface of the driving element 90, out of contact with the bearing assemblies 54.

The outer end of the bearing supporting sleeve 52 may be closed by a cap 57 having external threads 57' designed to make threading engagement with the adjacent internal threads of the head portion 53 of the bearing sleeve 52. The removable closure cap 57 may also be provided with a pair of spaced socket-wrench receiving holes 57" by means of which it may be readily attached and removed.

In order to withdraw the drilling tool from the driving head for repair or replacement by a drilling tool of different form, it is necessary that the driving element 90 be lifted out of driving contact with the circular body $o$ of the drill stem. It will be noted that the tubular housing 51 of the driving head has a hole 58 therein through which the driving element extends, as indicated in FIGS. 45–47. The tubular bearing supporting sleeve 52 also has a hole 59 therein through which the driving element 90 extends and which has an arcuate length of approximately ninety degrees as shown in FIGS. 46 and 47. The permanent magnet ring 56 also has a corresponding hole 58' therein through which the driving element 90 extends and which also has an angular length of approximately ninety degrees.

The driving element 90, normally held in driving contact with the circular body $o$ of the drill stem by the resilient arms 8 of the saddle member 7, may be swung into inoperative position as shown in FIG. 47 by rotating the head portion 53 of the bearing supporting sleeve 52 until one edge 59' of its angular hole 59 bears against the driving element 90, and thence pushes the driving element 90 into inoperative position as shown in FIG. 47. The entire drilling or cutting tool T may then be withdrawn from one end of the driving head 50. The bearing assemblies 54 can then be inspected and replaced, and the interior of the driving head cleaned, as desired, by removing the closure cap 57.

A modified form of drilling head 50' is shown in FIG. 50, and which is substantially identical to the drilling head 50 shown in FIG. 45, except that the modified drilling head 50' is designed to support a modified drilling tool T' which does not have a fly wheel fixed thereto. In the head construction shown in FIG. 50, a fly wheel 97 is provided which has a tubular neck portion 97' which is press fitted to the inner raceway 54" of the adjacent bearing assembly 54, and thus serves to maintain the drill head in gyratory balance. The flywheel 97 has a bore 98 therein through which the adjacent bearing portion 95 of the drill stem extends. The bore 98 of the flywheel 97 presents a pair of longitudinally extending grooves 98' which are designed to receive corresponding ribs 95b integral with the bearing portion 95 to thereby rotatively key the flywheel 97 to the tool stem and yet permit endwise withdrawal of the tool stem from the drilling head 50'.

The flywheel 95a forming an integral part of the drilling tool T mounted within the drilling head 50, and the flywheel 97 detachably fixed to the drilling tool T' mounted in the drilling head 50', insure substantial uniform and constant rotative speed to the tool stem, iron out any variations in speed due to slippage between the driving surface 94 of the driving element 90 and the cylindrical body $o$ of the tool stem, and respectively prevent liquid coolants applied to the cutting tip 96', and detritus cut from the work, from entering the driving head 50 or 50'.

The theoretical formulae for computing rotative speed (N) of the drill stem as above given, and theoretically computed on the basis of frequency and length of the orbital driving stroke delivered to the circular body $o$ of the tool stem, may not be fully achieved in actual practice due to inaccuracy of manufacture or assembly of these precision instruments, and slippage and frictional losses, which will reduce the theoretical rotative speed of the tool stem. However, if the same precision is applied to the formation and manufacture of its various parts, as practiced in the watch, jewelry and precision instrument industries, it has been found that the rotative speed (N) of the tool shaft as computed by theoretical formula can be substantially approached in actual practice.

It will be understood by those skilled in the art that numerous different forms of asymmetrical driving elements can be made and used in accordance with the principles and teachings of this invention, and as exemplified by the drawings and preceding disclosure. A slight asymmetry in the driving element is sufficient to produce the necessary ellipticity or orbital driving motion for satisfactory operation. Driving elements whose terminal driving portion is bent or asymmetrical to the symmetrical heel portion of the driving element, have design advantages over driving elements whose asymmetry is accomplished through adding asymmetrical weight to the driving end of the driving element.

It will be further understood that the examples disclosed in the drawings and specification are intended to be illustrative only, and from which the skilled in the art can readily produce numerous driving element modifications by following the above teachings.

The torque required to rotate the drill shaft is produced by the ultra high speed and tangential frictional driving force engendered by the tangential component of the orbital sweeping stroke of the driving tip of the driving element. The tool shaft may be supported by bearings suitably mounted in the driving head as illustrated in FIGS. 45 and 50, or the tool stem may be directly supported in an orbital hole provided in the operating end of the driving element. Where it is desired to produce an orbital motion cycle at the tool tip which is substantially circular, the driving hole is made substantially circular bearing so that its circular surface makes progressive contact with the circular body of the tool shaft. Thus, a slightly enlarged but correspondingly circular bearing hole in the driving end of the driving element, causes the tool stem to roll around the hole circumference. The frictional and tangentially applied contacts between the tool stem and driving surface of the driving element, occurring during the orbits of motion, produce the desired driving torque and rotation of the tool stem.

Where the tool stem supporting and the driving hole in the driving element are substantially elliptical, such as either a fat ellipse or a flat ellipse, the driving contacts occur at substantially diametrically opposite surface portions of the driving hole. Where the orbital motion produced is elliptical in form, the driving element is so made that the longer axis $x$ of the ellipse provides the driving stroke, and the shorter axis $y$ of the ellipse which is perpendicular to the $x$ axis, may be of substantially lesser length but nevertheless serves the useful purpose of keeping the tool stem in line.

In general, the higher the orbital frequency of the driving surface, the smaller is the driving stroke needed to achieve a given rotative tool stem speed, and hence the greater is the drilling precision which can be obtained.

It will also be obvious to those skilled in the art that other than magnetostrictive transducer means may be employed to produce the desired orbital cyclic motion of high frequency and minute amplitude necessary to produce the high speed rotation required. Thus, it is evident to the skilled in the art that transducers of the piezoelectric or electrodynamic types may be used.

In addition, the driving element may be so shaped, formed, dimensioned and constructed that its driving tip will produce orbital motion cycles combined with longitudinal vibrations extending generally parallel to the tool stem, and sometimes referred to as "linear vibrations."

While certain novel features of this invention have been disclosed herein and are pointed out in the claims, it will be understood that various omissions, substitutions, and changes may be made by those skilled in the art without departing from the spirit of this invention.

What is claimed is:

1. The method of rotating a journaled cylindrical body of small diameter at high rotative speeds which includes, placing the driving surface of a driving element in substantially tangential driving contact with the cylindrical surface of the journaled body, generating combined longitudinal and flexural motion strokes of the same high frequency at the driving surface of the driving element which are so relatively phased as to produce resultant unidirectional and high frequency orbital motion cycles at the driving surface of the driving element, and maintaining said driving surface in tangential driving contact with the cylindrical surface of the journaled body during a limited stroking component of each orbital motion cycle and while said limited stroking component is moving in a direction substantially normal to the radius of the cylindrical body at the point of tangential driving contact.

2. The method of rotating a journaled cylindrical body of small diameter at high rotative speeds which includes, placing the driving surface of a driving element in substantially tangential driving contact with the cylindrical surface of the journaled body, generating combined longitudinal and flexural motion strokes of the same high frequency at the driving surface of the driving element which are so relatively phased as to produce resultant unidirectional and high frequency ovaloid motion cycles at the driving surface of the driving element, and maintaining said driving surface in tangential driving contact with the cylindrical surface of the journaled body during a limited stroking component of each ovaloid motion cycle and while said limited stroking component is moving in a direction substantially normal to the radius of the cylindrical body at the point of tangential driving contact.

3. The method of rotating a journaled cylindrical body at high rotative speeds which includes, placing the driving surface of a driving element substantially in tangential contact with a cylindrical surface of the journaled body, generating combined longitudinal and flexural motion strokes having the same high frequency at the driving surface of the driving element which are so relatively phased as to produce resultant high frequency unidirectional elliptical motion cycles at the driving surface of the driving element, and maintaining said driving surface in tangential driving contact with the cylindrical surface of the journaled body during a limited longitudinal stroking component of each elliptical motion cycle and while the longitudinal motion component is moving in a direction substantially normal to the radius of the cylindrical body at the point of tangential driving contact.

4. The method of rotating a journaled cylindrical body having a diameter of not substantially more than three millimeters at rotative speeds in excess of five hundred revolutions per second which includes, placing the driving surface of a driving element substantially in tangential contact with the cylindrical surface of the journaled body, generating combined longitudinal and flexural motion strokes having the same high frequency at the driving surface of the driving element which are so relatively phased as to produce resultant uni-directional orbital motion cycles at the driving surface of the driving element at frequencies in the order of twenty-thousand to forty-thousand orbital motion cycles per second, and maintaining said driving surface in tangential driving contact with the cylindrical surface of the journaled body during a limited stroking component of each orbital motion cycle and while said limited stroking motion component is moving in a direction substantially normal to the radius of the cylindrical body at the point of tangential driving contact.

5. The method of rotating a journaled cylindrical body having a diameter of not substantially more than three millimeters at ultra-high rotative speeds which includes, placing the driving surface of a driving element substantially in tangential contact with a cylindrical surface of the journaled body, generating combined longitudinal and flexural motion strokes having the same high frequency at the driving surface of the driving element which are so relatively phased as to produce resultant uni-directional elliptical motion cycles at the driving surface of the driving element at frequencies in the order of five to forty-thousand elliptical motion cycles per second, and maintaining said driving surface in tangential driving contact with the cylindrical surface of the journaled body during a limited longitudinal stroking component of each elliptical motion cycle and while the longitudinal motion component is moving in a direction substantially normal to the radius of the cylindrical body at the point of tangential driving contact.

6. The method of rotating a journaled cylindrical body of small diameter at high rotative speed which includes, placing the cylindrical body between a pair of opposite driving surfaces of a common driving element with the opposite driving surfaces substantially in tangential contact with adjacent diametrically opposed portions of the cylindrical surface of the journaled body, generating combined longitudinal and flexural motion strokes having the same high frequency at the opposite driving surfaces of the common driving element which are so relatively phased as to produce resultant uni-directional orbital motion cycles at the opposite driving surfaces of the driving element, and maintaining said opposite driving surfaces in alternating driving contact with the directly adjacent cylindrical surface portion of the journaled body during a limited stroking component of each orbital motion cycle and while the limited stroking component is moving in a direction substantially normal to the radius of the cylindrical body at the point of tangential driving contact, and then alternately withdrawing the opposite driving surfaces from driving contact with the adjacent cylindrical surface portions during completion of the remaining part of the respective orbital motion cycles.

7. The method of rotating a journaled cylindrical body of small diameter at high rotative speeds which includes, placing the cylindrical body between a pair of opposite driving surfaces of a common driving element with the opposite driving surfaces substantially in tangential contact with adjacent diametrically opposed portions of the cylindrical surface of the journaled body, generating combined longitudinal and flexural motion strokes having the same high frequency at the opposite driving surfaces of the common driving element which are so relatively phased as to produce resultant uni-directional and ovaloid motion cycles at the opposite driving surfaces of the driving element, and maintaining said opposite driving surfaces in alternating driving contact with the directly adjacent cylindrical surface portion of the journaled body during a limited stroking component of each ovaloid motion cycle and while the limited stroking component is moving in a direction substantially normal to the radius of the cylindrical body at the point of tangential driving contact, and then alternately withdrawing the opposite driving surfaces from driving contact with the adjacent cylindrical surface portions during completion of the remaining part of each ovaloid motion cycle.

8. The method of rotating a journaled cylindrical body of small diameter at high rotative speeds which includes, placing the cylindrical body between a pair of opposite driving surfaces of a common driving element with the opposite driving surfaces substantially in tangential contact with adjacent diametrically opposed portions of the cylindrical surface of the journaled body, generating combined longitudinal and flexural motion strokes having the same high frequency at the opposite driving surfaces of the common driving element which are so relatively phased as to produce resultant uni-directional elliptical motion cycles at the opposite driving surfaces of the driving element, and maintaining said opposite driving surfaces in alternating driving contact with the directly adjacent cylindrical surface portion of the journaled body during a limited longitudinal stroking component of each elliptical motion cycle and while the limited longitudinal stroking component is moving in a direction substantially normal to the radius of the cylindrical body at the point of tangential driving contact, and then alternately withdrawing the opposite driving surfaces from driving contact with the adjacent cylindrical surface portions during completion of the remaining part of each elliptical motion cycle.

9. The method of rotating a journaled cylindrical body having a diameter of not substantially more than two millimeters at rotative speeds in excess of five hundred revolutions per second which includes, placing the cylindrical body between a pair of opposite driving surfaces of a common driving element with the opposite driving surfaces substantially in tangential contact with adjacent diametrically opposed portions of the cylindrical surface of the journaled body, generating combined longitudinal and flexural motion strokes having the same high frequency at the opposite driving surfaces of the common driving element which are so relatively phased as to produce resultant uni-directional and elliptical motion cycles at the opposite driving surfaces of the driving element at cyclic frequencies in the order of ten to forty thousand cycles per second, and maintaining said opposite driving surfaces in alternating driving contact with the directly adjacent cylindrical surface portion of the journaled body during a limited longitudinal stroking component of each elliptical motion cycle and while the limited longitudinal stroking component is moving in a direction substantially normal to the radius of the cylindrical body at the point of tangential driving contact, and then alternately withdrawing the opposite driving surfaces from driving contact with the adjacent cylindrical surface portions during completion of the remaining part of each elliptical motion cycle.

10. The method of supporting and rotating a cylindrical body of small diameter at high rotative speeds which includes, inserting the cylindrical body into a bearing hole of a driving element, generating cyclic vibrations of high frequency and minute amplitude along the inner bearing surface of the bearing hole of the driving element to thereby cause the inner bearing surface to execute characteristically orbital motion cycles in the same orbital direction, said bearing surface presenting at least two diametrically opposite surface portions which are substantially parallel to one axis of the motion cycles generated at said diametrically opposite surface portions, said diametrically opposite surface portions being diametrically spaced a distance substantially equal to the diameter of the cylindrical body plus the length of that axis of the motion cycle which is perpendicular to the first named axis, and maintaining said diametrically opposite bearing surface portions in alternating driving contact with the directly adjacent surface portion of the cylindrical body during a part of each motion cycle which extends in the direction of said first named axis.

11. The method of supporting and rotating a cylindrical body of small diameter at high rotative speeds which includes, inserting the cylindrical body into a bearing hole of a driving element, generating cyclic vibrations of high frequency and minute amplitude along the inner bearing surface of the bearing hole of the driving element to thereby cause the inner bearing surface to execute high frequency ovaloid motion cycles in the same orbital direction, said bearing surface presenting a plurality of pairs of diametrically opposite surface portions which are substantially parallel to one axis of the motion cycles generated at the corresponding diametrically opposite surface portions, each pair of diametrically opposite surface portions being diametrically spaced a distance substantially equal to the diameter of the cylindrical body plus the length of that axis of the motion cycle which is perpendicular to the first named axis, and maintaining each of the paired diametrically opposite bearing surface portions in alternating driving contact with the directly adjacent surface portion of the cylindrical body during a part of the motion cycle which extends in the direction of said first named axis.

12. The method of supporting and rotating a cylindrical body of small diameter at high rotative speeds which includes, inserting the cylindrical body into a bearing hole of a driving element, generating cyclic vibrations of high frequency and minute amplitude along the inner surface of the bearing hole of the driving element to thereby cause the inner surface of the bearing hole to execute generally elliptical motion cycles oriented in substantially the same axial and orbital direction, said bearing surface presenting at least two diametrically opposite surface portions which are substantially parallel to the longer axis of the elliptical motion cycles generated at said diametrically opposite surface portions, said diametrically opposite surface portion being diametrically spaced a distance substantially equal to the diameter of the cylindrical body plus the length of that axis of the elliptical motion cycle which is perpendicular to the longer axis thereof, and maintaining said diametrically opposite bearing surface portions in alternating driving contact with the directly adjacent surface portion of the cylindrical body during a part of the motion cycle which extends in the direction of the longer axis thereof.

13. The method of supporting and rotating drilling, cutting and boring tools at least a portion of whose shafts have a cylindrical body of small diameter at high rotative speeds which includes, inserting the cylindrical body into a bearing hole of a driving element, generating longitudinal and flexural vibrations of high frequency and minute amplitude along the inner surface of the bearing hole of the driving element to thereby cause the inner surface of the bearing hole to execute generally elliptical motion cycles having substantially the same orientation and orbital direction, said bearing surface presenting at least two diametrically opposite surface portions which are substantially parallel to the longer axis of the elliptical motion cycles generated at said diametrically opposite surface portions, said diametrically opposite surface portions being diametrically spaced a distance substantially equal to the diameter of the cylindrical body plus the length of that axis of the elliptical motion cycle which is perpendicular to the longer axis, maintaining said diametrically opposite bearing surface portions in alternating driving contact with the directly adjacent surface portion of the cylindrical body during a part of each motion cycle which extends in the direction of the longer axis thereof, and then alternately withdrawing the diametrically opposed driving surfaces from driving contact with the adjacent surface portions of the cylindrical body during completion of the remaining part of the motion cycle.

14. The method of supporting and rotating drilling, cutting and boring tools at least a portion of whose shafts have a cylindrical body having a diameter of not substantially more than two millimeters at a rotative speed in excess of five hundred revolutions per second which includes, inserting the cylindrical body into a bearing hole of a driving element, generating longitudinal and flexural vibrations of high frequency and minute amplitude along the inner surface of the bearing hole of the driving element to thereby cause the inner surface of the bearing hole to execute generally elliptical motion cycles of substantially the same orientation and in substantially the same orbital direction at rates in the order of ten thousand to forty thousand cycles per second, said bearing surface presenting at least two diametrically opposite surface portions which are substantially parallel to the longer axis of the elliptical motion cycles generated at said diametrically opposite surface portions, said diametrically opposite surface portions being diametrically spaced a distance substantially equal to the diameter of the cylindrical body plus the length of that axis of the elliptical motion cycle which is perpendicular to the longer axis, maintaining said diametrically opposite bearing surface portions in alternating driving contact with the directly adjacent surface portion of the cylindrical body during a part of each motion cycle which extends in the direction of the longer axis thereof, and then alternately withdrawing the diametrically opposed driving surfaces from driving contact with the adjacent surface portion of the cylindrical body during completion of the remaining part of the motion cycle.

15. The method of simultaneously rotating and longitudinally reciprocating drilling, cutting, boring, polishing and like tools at ultra high rotative and longitudinally reciprocative speeds and wherein at least a part of the tool stem presents a cylindrical body, said method including; supporting the cylindrical body of the tool stem for rotation and longitudinal reciprocation, placing the driving surface of a driving element substantially in tangential contact with the peripheral surface of the cylindrical body, generating orbital vibrations of high frequency and minute amplitude at the driving surface of the driving element to cause the driving surface to execute generally ovaloid motion cycles oriented in substantially the same orbital direction, simultaneously generating vibrations at the driving surface which are substantially parallel to the longitudinal axis of the cylindrical body at reciprocating rates substantially corresponding to the orbital rates of the ovaloid motion cycles, maintaining said driving surface in tangential driving contact with the peripheral surface of the cylindrical body during a limited stroking component of each ovaloid motion cycle and while said stroking component is moving in a direction substantially normal to the radius of the cylindrical body at the point of tangential driving contact, and then withdrawing the driving surface from tangential contact with the peripheral surface of the cylindrical body during the remainder of each ovaloid motion cycle.

16. The method of simultaneously rotating and longitudinally reciprocating drilling, cutting, boring, polishing and like tools at ultra high rotative and longitudinally reciprocative speeds and wherein at least a part of the tool stem presents a cylindrical body, said method including; supporting the cylindrical body of the tool stem for rotation and longitudinal reciprocation, placing the driving surface of a driving element substantially in tangential contact with the peripheral surface of the cylindrical body, generating orbital vibrations of high frequency and minute amplitude at the driving surface of the driving element to thereby cause the driving surface to execute generally elliptical motion cycles oriented in substantially the same orbital direction, simultaneously generating vibrations at the driving surface which are substantially parallel to the longitudinal axis of the cylindrical body at reciprocating rates substantially corresponding to the orbital rates of the elliptical motion cycles, maintaining said driving surface in tangential driving contact with a peripheral surface of the cylindrical body during a limited stroking component of each elliptical motion cycle and while said stroking component is moving in a direction substantially normal to the radius of the cylindrical body at the point of tangential driving contact, and then withdrawing the driving surface from tangential contact with the peripheral surface of the cylindrical body during the remainder of each elliptical motion cycle.

17. The method of simultaneously rotating and longitudinally reciprocating drilling, cutting, boring, polishing and like tools at ultra high rotative and longitudinally reciprocative speeds and wherein at least a part of the tool stem presents a cylindrical body, said method including; supporting the cylindrical body of the tool stem for rotation and longitudinal reciprocation, placing a pair of substantially diametrically opposite driving surfaces of a driving element substantially in tangential contact with the substantially diametrically opposite surfaces of the cylindrical body, generating orbital vibrations of high frequency and minute amplitude at the opposite driving surfaces of the driving element to thereby cause the opposite driving surfaces to execute generally orbital motion cycles oriented in substantially the same orbital direction, simultaneously generating vibrations at the driving surfaces which are substantially parallel to the longitudinal axis of the cylindrical body at reciprocating rates substantially corresponding to the orbital rates of the orbital motion cycles, maintaining said opposite driving surfaces in alternating tangential driving contact with the opposite peripheral surface portions of the cylindrical body during a limited stroking component of each orbital motion cycle and while said stroking component is moving in a direction substantially normal to the radius of the cylindrical body at the point of tangential driving contact, and then alternately withdrawing the opposite driving surfaces from tangential contact with the peripheral surface of the cylindrical body during the remainer of each orbital motion cycle.

18. A device for rotating at ultra high rotative speeds various drilling, cutting, boring, polishing and like tools whose tool stem presents a journaled cylindrical body, which includes; a casing, an energizing coil contained in said casing, an electromechanical transducer telescoped into said energizing coil and designed to longitudinally vibrate at high frequency and minute amplitude when said surrounding coil is energized by biased alternating current, a connecting body fixed to one end of said transducer and operative to magnify the length of the longitudinal vibrations transmitted to it by said transducer, a driving element fixed to said connecting body and presenting a driving surface at the outer end thereof which is asymmetric to the longitudinal axis of said transducer and connecting body, said driving element being designed to convert the longitudinal input vibrations into orbital motion cycles at the driving surface of the element which are oriented in the plane of asymmetry, and supporting means including a bearing housing connected to one end of said casing and bearings in said housing designed to rotatably support the cylindrical tool body, said supporting means being operative to maintain the driving surface of said driving element in tangential driving contact with the periphery of the cylindrical body during a limited stroking component of each orbital motion cycle and while said limited stroking component is moving in a direction substantially normal to the radius of the cylindrical body at the point of tangential driving contact.

19. A device for rotating at ultra high rotative speeds various drilling, cutting, boring, polishing and like tools whose tool stem presents a journaled cylindrical body, which includes; a casing, an energizing coil contained in said casing, an electromechanical transducer telescoped into said energizing coil and designed to longitudinally vibrate at high frequency and minute amplitude when said surrounding coil is energized by biased alternating current, a connecting body fixed to one end of said transducer and operative to magnify the length of the longitudinal vibrations transmitted to it by said transducer, a driving element fixed to said connecting body and presenting a driving surface at the outer end thereof, said driving element having at least one driving surface thereof which is asymmetric to the longitudinal axis of said transducer and connecting body and which lies in a plane substantially parallel to said longitudinal axis, said driving element being designed to convert the longitudinal input vibrations into generally elliptical motion cycles at the driving surface of the element which are oriented in the plane of asymmetry, and supporting means including a bearing housing connected to one end of said casing and bearings in said housing designed to rotatably support the cylindrical tool body, said supporting means being operative to maintain the driving surface of said driving element in tangential driving contact with the periphery of the cylindrical body during a limited stroking component of each elliptical motion cycle and while the said limited stroking component is moving in a direction substantially normal to the radius of the cylindrical body at the point of tangential driving contact.

20. A device for rotating at ultra high rotative speeds various drilling, cutting, boring, polishing and like tools whose tool stem presents a journaled cylindrical body, which includes; an energizing coil, an electromechanical transducer telescoped into said energizing coil and designed to longitudinally vibrate at high frequency and minute amplitude when said surrounding coil is energized by biased alternating current, a connecting body fixed to one end of said transducer and operative to magnify the length of the longitudinal vibrations transmitted to it by said transducer, a driving element fixed to said connecting body, said driving element being asymmetric to the longitudinal axis of said transducer and connecting body and designed to convert the longitudinal input vibrations into ovaloid motion cycles at the outer end portion of the driving element, and a bearing hole extending transversely through the outer end portions of said driving element and adapted to rotatably support the cylindrical tool body, said bearing hole presenting a pair of diametrically opposed driving surfaces which are oriented in the plane of asymmetry and which are operative to move into alternating driving contact with the periphery of the cylindrical tool body during portions of the ovaloid motion cycles of the outer end portion of said driving element.

21. A device for rotating at ultra high rotative speeds various drilling, cutting, boring, polishing and like tools whose tool stem presents a cylindrical body, which includes; an energizing coil, an electromechanical transducer telescoped into said energizing coil and designed to longitudinally vibrate at high frequency and minute amplitude when said surrounding coil is energized by biased alternating current, a connecting body fixed to one end of said transducer and operative to magnify the length of the longitudinal vibrations transmitted to it by said transducer, a driving element fixed to said connecting body and presenting a bearing hole at the outer end portion thereof adapted to rotatably support the cylindrical tool body, said driving element being asymmetric to the longitudinal axis of said transducer and connecting body and designed to convert the longitudinal input vibrations into ovaloid motion cycles extending around the inner bearing surface of the bearing hole and which ovaloid motion cycles are oriented in the plane of asymmetry, the ovaloid motion cycles produced at the end portion of said driving element being operative to move progressive portions of said bearing surface in tangential driving contact with the periphery of the cylindrical body during each ovaloid motion cycle.

22. A device for rotating at ultra high rotative speeds a cluster of various drilling, cutting, boring, polishing and like tools each of whose tool stems presents a cylindrical body, which includes; an energizing coil, an electromechanical transducer telescoped into said energizing coil and designed to longitudinally vibrate at high frequency and minute amplitude when said surrounding coil is energized by biased alternating current, a connecting body fixed to one end of said transducer and operative to magnify the length of the longitudinal vibrations transmitted to it by said transducer, a driving element fixed to said connecting body and presenting a cluster of bearing holes at the outer end portion thereof adapted to provide rotative support for the respective cylindrical bodies, said driving element begins asymmetric to the longitudinal axis of said transducer and connecting body and designed to convert the longitudinal input vibrations into ovaloid motion cycles extending around the inner bearing surface of each of said bearing holes, with all of said ovaloid motion cycles oriented in the plane of asymmetry, the ovaloid motion cycles produced at the end portion of said driving element being operative to move progressive portions of each of said bearing surfaces into driving contact with the periphery of the respective cylindrical bodies during each of the ovaloid motion cycles.

23. A device for rotating at ultra high rotative speeds and simultaneously reciprocating at high frequency, various drilling, cutting, boring, polishing and like tools, whose tool stem presents a cylindrical body, which includes; an energizing coil, an electromechanical transducer telescoped into said energizing coil and designed to vibrate longitudinally at high frequency and minute amplitude when said surrounding coil is energized by biased alternating current, a connecting body fixed to one end of said transducer and operative to magnify the length of the longitudinal vibrations transmitted to it by said transducer, a driving element fixed to said connecting body and presenting a bearing hole at the outer end portion thereof and adapted to rotatably and reciprocably support the cylindrical tool body, said driving element being asymmetric to the longitudinal axis of said transducer and connecting body, said driving element having two bend portions whose axes are inclined with respect to each other and whereby said driving element is operative to convert the longitudinal input vibrations into ovaloid motion cycles extending around the inner bearing surface of the bearing hole and a reciprocating motion component extending substantially parallel to the axis of said cylindrical tool body, the ovaloid motion cycles produced at the end portion of said driving element being operative to move progressive portions of said bearing surface in tangential driving contact with the periphery of the cylindrical tool body during each ovaloid motion cycle and to thereby rotate the cylindrical tool body, said parallel component of the ovaloid motion cycles produced at the end portion of said driving element being operative to longitudinally reciprocate said cylindrical tool body along its axis at a frequency corresponding to the ovaloid motion cycles.

24. An instrument for rotating a cylindrically bodied tool stem of small diameter at high rotative speeds which includes, a tubular casing, an energizing coil supported within said casing, a mechanical vibrator extending into and supported by said casing and which includes, an electromechanical transducer adapted to be telescoped into said coil and designed to longitudinally vibrate at high frequency and low amplitude when said surrounding coil is energized by biased alternating current, a connecting body fixed to one end of said transducer and operative to magnify the length of the longitudinal vibratrations transmitted to it by said transducer, a driving element of asymmetrical form fixed to one end of said connecting body at one end thereof and presenting a driving surface at the other end thereof and designed to convert the longitudinal input vibrations into unidirectional orbital motion cycles at the driving surface of the element, means for supporting said vibrator at approximately a node of motion thereof, and supporting means including a bearing housing connected to one end of said casing and bearings in said housing designed to rotatably support the cylindrical tool body, said supporting means being operative to maintain the driving surface of said driving element in tangential driving contact with said driving surface during a limited stroking component of each orbital motion cycle and while the limited stroking component is moving in a direction substantially normal to the radius of the cylindrical body at the point of tangential driving contact.

25. An instrument for rotating a cylindrically bodied tool stem of small diameter at high rotative speeds which includes, a tubular casing, an energizing coil supported within said casing, a mechanical vibrator which includes, an electromechanical transducer adapted to be telescoped into said coil and designed to longitudinally vibrate at high frequency and low amplitude when said surrounding coil is energized by biased alternating current, a connecting body fixed to one end of said transducer and operative to magnify the length of the longitudinal vibrations transmitted to it by said transducer, a driving element of asymmetrical form fixed to one end of said connecting body at one end thereof and presenting a driving surface at the other end thereof and designed to convert the longitudinal input vibrations into uni-directional orbital motion cycles at the driving surface of the element, means within said casing for supporting said vibrator at approximately a node of motion thereof, and a bearing hole extending through the terminal end portion of said driving element and adapted to rotatably support the tool stem, said bearing hole presenting a pair of diametrically opposed driving surfaces which are oriented in the plane of asymmetry and which are operative to move into alternating tangential driving contact with the periphery of the cylindrical tool stem during portions of the ovaloid motion cycles produced at the end portion of said driving element.

26. A dental and surgical instrument designed to rotate a cylindrically bodied cutting tool of small diameter at high rotative speeds which includes, a tubular casing, an energizing coil supported within said casing, a mechanical vibrator extending into and supported by said casing and which includes, an electromechanical transducer telescoped into said coil and designed to longitudinally vibrate at high frequency and low amplitude when said surrounding coil is energized by biased alternating current, a connecting body fixed to one end of said transducer and operative to magnify the length of the longitudinal vibrations transmitted to it by said transducer, a driving element of asymmetrical form fixed to one end of said connecting body at one end thereof and presenting a driving surface at the other end thereof and designed to convert the longitudinal input vibrations into orbital vibrations at the driving surface of the element, and tool stem supporting means including a driving head, bearings in said driving head designed to rotatively support the tool stem, a tubular shank fixed to said driving head and detachably connected to said tubular casing and through which at least a portion of said driving element extends, said tool stem supporting means being operative to maintain the driving surface of the driving element in tangential driving contact with the cylindrical body of said tool stem during a limited stroking component of each orbital motion cycle and while said limited stroking component is moving in a direction substantially normal to the radius of the cylindrical body of the tool stem at the point of tangential driving contact.

27. A dental and surgical instrument designed to rotate a cylindrically bodied cutting tool of small diameter at high rotative speeds which includes, a tubular casing, an energizing coil supported within said casing, a mechanical vibrator extending into and supported by said casing and which includes, an electromechanical transducer adapted to be telescoped into said coil and designed to longitudinally vibrate at high frequency and low amplitude when said surrounding coil is energized by biased alternating current, a connecting body fixed to one end of said transducer, an angular shaped driving element of asymmetrical form fixed to one end of said connecting body at one end thereof and presenting a driving surface at the other end thereof designed to convert the longitudinal input vibrations into orbital vibrations at the driving surface of the element, and tool stem supporting means including a driving head, bearings in said driving head designed to rotatively support the tool stem, a tubular shank fixed to said driving head and detachably connected to said tubular casing and through which at least a portion of said driving element extends, said tool stem supporting means being operative to maintain the driving surface of the driving element in orbital driving contact with the cylindrical body of said tool stem.

28. A dental and surgical instrument which includes, a tool stem presenting a small diameter cylindrical body designed to be rotated at high rotative speeds, a tubular casing, an energizing coil supported within said casing, a mechanical vibrator extending into and supported by said casing and which includes, an electromechanical transducer adapted to be telescoped into said coil and designed to longitudinally vibrate at high frequency and low amplitude when said surrounding coil is energized by biased alternating current, a connecting body fixed to one end of said transducer, a driving element of asymmetrical form fixed to one end of said connecting body at one end thereof and presenting a driving surface at the other end thereof designed to convert the longitudinal input vibrations into orbital vibrations at the driving surface of the element, and tool stem supporting means including a driving head, bearings in said driving head designed to rotatively support the tool stem, a tubular shank fixed to said driving head and connected to said tubular casing and through which at least a portion of said driving element extends, said tool stem supporting means being operative to maintain the driving surface of the driving element in orbital driving contact with the cylindrical body of said tool stem, said tool stem having a flywheel member connected thereto for smoothing out the rotation of the tool stem as impelled by the cyclic driving strokes of said driving element.

29. A dental and surgical instrument designed to rotate a cylindrically bodied cutting tool of small diameter at high rotative speeds which includes, a tubular casing, an energizing coil supported within said casing, a mechanical vibrator which includes, an electromechanical transducer telescoped into said coil and designed to longitudinally vibrate at high frequency and low amplitude when said surrounding coil is energized by biased alternating current, a connecting body fixed to one end of said transducer and operative to magnify the length of the longitudinal vibrations transmitted to it by said transducer, a driving element of asymmetrical form fixed to one end of said connecting body at one end thereof and presenting a driving surface at the other end thereof and designed to convert the longitudinal input vibrations into orbital vibrations at the driving surface of the element, means for supporting said vibrator at substantially a node of vibration, a driving head, bearings in said driving head designed to rotatively support the tool stem, a tubular shank fixed to said driving head and detachably connected to said tubular casing and through which at least a portion of said driving element extends, and means for maintaining the driving surface of the driving element in orbital driving contact with the cylindrical body of said tool stem, said means including a resilient element in said casing operative to apply a tilting force to the vibrator directed to maintain said orbital driving contact.

30. In combination, a rotary cutting tool and instrument designed to rotate said cutting tool at ultra high rotative speeds; said cutting tool having a cylindrical stem portion, a cutting point at one end thereof and an enlarged head portion at the other end thereof, a tubular casing, an energizing coil supported within said casing, a mechanical vibrator extending into and supported by said casing and which includes, an electromechanical transducer adapted to be telescoped into said coil and designed to longitudinally vibrate at high frequency and low amplitude when said surrounding coil is energized by biased alternating current, a connecting body fixed to one end of said transducer, a driving element of asymmetrical form fixed to one end of said connecting body at one end thereof and presenting a driving surface at the other end thereof designed to convert the longitudinal input vibrations into orbital vibrations at the driving surface of the element, said driving element having a hole therein in which the cylindrical body of said cutting tool is rotatably supported, said supporting hole having a seating portion against which the head portion of said tool is designed to rotatably seat, and resilient means for maintaining said cutting tool in operative position.

References Cited in the file of this patent
UNITED STATES PATENTS

| | | |
|---|---|---|
| 2,596,226 | Eldridge | May 13, 1952 |
| 2,874,470 | Richards | Feb. 24, 1959 |